(12) United States Patent
Anderson

(10) Patent No.: US 7,818,746 B2
(45) Date of Patent: Oct. 19, 2010

(54) SYSTEM AND METHOD FOR BENCHMARKING USING A MULTI-THREADED LOAD GENERATOR

(75) Inventor: Eric A. Anderson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1524 days.

(21) Appl. No.: 11/093,453

(22) Filed: Mar. 30, 2005

(65) Prior Publication Data

US 2006/0230317 A1  Oct. 12, 2006

(51) Int. Cl.
  *G06F 9/46* (2006.01)
  *G06F 12/00* (2006.01)
  *G06F 11/30* (2006.01)

(52) U.S. Cl. .......................... 718/102; 710/1; 710/200; 702/108; 702/182; 702/186

(58) Field of Classification Search ................. 718/102; 702/186, 108, 182; 714/21; 710/1, 200
  See application file for complete search history.

(56) References Cited

U.S. PATENT DOCUMENTS

| | | | |
|---|---|---|---|
| 5,303,166 A | 4/1994 | Amalfitano et al. | |
| 5,347,647 A | 9/1994 | Alt et al. | |
| 5,504,670 A | 4/1996 | Barth et al. | |
| 5,615,357 A | 3/1997 | Ball | |
| 5,761,659 A | 6/1998 | Bertoni | |
| 5,819,066 A * | 10/1998 | Bromberg et al. ........... | 707/102 |
| 5,913,073 A | 6/1999 | LeCrone | |
| 5,991,808 A | 11/1999 | Broder et al. | |
| 6,118,940 A | 9/2000 | Alexander, III et al. | |
| 6,321,308 B1 | 11/2001 | Arnon et al. | |
| 6,401,056 B1 | 6/2002 | Sirois | |
| 6,449,614 B1 | 9/2002 | Marcotte | |
| 6,453,269 B1 | 9/2002 | Quernemoen | |
| 6,509,730 B1 | 1/2003 | Afsah | |
| 6,609,084 B2 | 8/2003 | Midde Peddanna | |
| 6,769,054 B1 * | 7/2004 | Sahin et al. .................. | 711/162 |
| 6,823,351 B1 | 11/2004 | Flood et al. | |
| 6,973,521 B1 | 12/2005 | Indiresan et al. | |
| 7,213,113 B2 * | 5/2007 | Sahin et a .................... | 711/162 |
| 7,257,516 B2 * | 8/2007 | Arora et al. .................. | 702/186 |
| 7,594,234 B1 * | 9/2009 | Dice ........................... | 718/108 |
| 2004/0083481 A1 | 4/2004 | Shultz et al. | |
| 2004/0088573 A1 | 5/2004 | Jeyaram | |
| 2004/0199815 A1 * | 10/2004 | Dinker et al. .................. | 714/21 |
| 2004/0221115 A1 * | 11/2004 | Sahin et al. .................. | 711/154 |
| 2005/0071438 A1 * | 3/2005 | Liao et al. .................... | 709/214 |

(Continued)

OTHER PUBLICATIONS

Anderson et al, "Buttress: A Toolkit for Flexible and High Fidelity I/O Benchmarking", Usenix, Mar. 31, 2004, pp. 1-15.*

(Continued)

*Primary Examiner*—Meng-Ai An
*Assistant Examiner*—Jennifer N To

(57) ABSTRACT

According to one embodiment, a benchmarking system comprises a processor and a multi-threaded load generator. The multi-threaded load generator uses events for managing processing by the threads. The load generator utilizes a thread for spinning and using a CPU cycle counter to determine time for issuing loads to a system under test in accordance with a defined workload.

35 Claims, 13 Drawing Sheets

U.S. PATENT DOCUMENTS

2006/0101472 A1    5/2006    Davis
2006/0225077 A1   10/2006   Anderson

OTHER PUBLICATIONS

Grega, W., "Hardw are-in-the-loop simulation and its application in control education", 29th ASEE/IEEE Frontiers in Education Conference, Nov. 10, 1999, 6 pages.

Glinsky, E. et al., "Modeling and Simulation of Hardware/Software Systems with CD+ +", Proceedings of the 2004 Winter Simulation Conference, pp. 198-205.

Blumofe, R., et al., "Scheduling Multithreaded Computations by Work Stealing", IEEE FOCS '94, Nov. 20-22, 1994, 13 pages.

"Posix Threads Programming", [online] Retrieved on Mar. 2, 2005 Retrieved from: http://www.llnl.gov/computing/tutorials/workshops/workshop/pthreads/MAIN.html 29 pages.

Manku, G., et al., "Approximate Medians and other Quantiles in One Pass and with Limited Memory", Proc of the 1998 ACM SIGMOD Intl. Conf. on Management of Data, 1998, pp. 426-435.

Robison, A., "The Abstraction Penalty for Small Objects in C+ +" [online] Retrieved on Apr. 4, 2005 Retrieved from: Http://web.archive.org/web/20030224175656/.

Dubois, P. "C+ + Gets Faster for Scientific Computing" Computers in Physics, vol. 10, No. 5, Sep./Oct. 1996, pp. 458-462.

U.S. Appl. No. 11/093,827, filed Mar. 30, 2005, 50 pages.

U.S. Appl. No. 11/093,827 Non-Final Rejection mailed Nov. 12, 2009, 32 pages.

U.S. Appl. No. 11/094,554, filed Mar. 30, 2005, 48 pages.

U.S. Appl. No. 11/094,554 Non-Final Rejection mailed Jun. 25, 2009, 40 pages.

U.S. Appl. No. 11/094,554 Final Rejection mailed Jan. 22, 2010, 33 pages.

U.S. Appl. No. 11/094,554 Notice of Allowance mailed May 12, 2010, 21 pages.

* cited by examiner

SYSTEM AND METHOD FOR BENCHMARKING USING A MULTI-THREADED LOAD GENERATOR

CROSS-REFERENCE TO RELATED APPLICATIONS

The present application is related to U.S. patent application Ser. No. 11/094,554 titled "SYSTEM AND METHOD FOR DYNAMICALLY DETERMINING A THREAD TO PERFORM WORK USING A LOCKABLE RESOURCE" filed Mar. 30, 2005 (now U.S. Patent Publication No. 2006/0225078), and Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077), the disclosures of which are hereby incorporated herein by reference.

FIELD OF THE INVENTION

The below description is related generally to benchmarking systems, and more particularly to a load generator for accurately generating a load in accordance with a desired workload for use in benchmarking a system under test.

DESCRIPTION OF RELATED ART

Benchmarking, in general, is the process of measuring and/or predicting the performance of a system under study by subjecting such system to a workload. The workload to which the system is subjected during benchmarking may, in some instances, be an actual workload that is experienced in the environment in which the system under test is destined, or a synthetic workload, as examples. The performance of various types of systems, or parts thereof, are commonly benchmarked, including without limitation networks, processors, and input/output ("I/O") systems. For instance, I/O benchmarking is the process of comparing I/O systems by subjecting them to known workloads. As used herein, "I/Os" refer to any type of input or output used for benchmarking a system under test. Examples of common I/Os include data storage accesses, such as reads and/or writes. Thus, the workloads for an I/O system includes under test may include such I/Os as reads from and writes to data storage, such as memory/cache, hard disk, peripheral storage, etc. of the system. I/O benchmarking is a widespread practice in the storage industry and serves as the basis for purchasing decisions, performance tuning studies, and marketing campaigns. The typical reason for pursuing an I/O benchmark is to answer the following question for the storage user: "how does a given storage system perform for my work load?" That is, the storage user would like to use the I/O benchmark to determine how well a given system under consideration performs for the user's actual or expected workload, which can be used for comparing the given system to other systems under consideration. This aids a user in making an informed decision regarding the proper system to select for his/her goals.

Various techniques have been developed for benchmarking a system under study. In general, there are three approaches one might adopt for benchmarking an I/O system, based on the trade-off between experimental complexity and resemblance to the application:

a) Connect the I/O system under test to the production/test environment, run the real application, and measure application metrics;

b) Collect traces from a running application and replay them (after possible modifications) back on to the I/O system under test; or c) Generate synthetic workloads and measure the I/O system's performance for different parameters of the synthetic workload.

The first method is generally ideal in that it measures the performance of the system under test at the point that is most interesting: one where the system is actually going to be used. However, it is also the most difficult to set up in a test environment because of the cost and complexity involved in setting up real applications or the difficulty/risk of connecting a production system to a test system. Additionally, this approach lacks flexibility. For instance, the configuration of the whole system may need to be changed to evaluate the storage system at different load levels or application characteristics.

The other two approaches, replaying traces of the application and using synthetic workloads (e.g., the well-known SPC-1 benchmark available from the Storage Performance Council), though less ideal, are commonly used because of the benefits of lower complexity, lower setup costs, predictable behavior, and better flexibility. Trace replay is particularly attractive as it eliminates the need to understand the application in detail. The main criticism of these latter two approaches is the validity of the abstraction, in the case of synthetic workloads, and the validity of the trace in a modified system, in the case of trace replay. Accordingly, I/O trace replay, for example, is not commonly used because a good benchmarking system for this technique has not been publicly available.

In general, there are two aspects of I/O benchmarking: 1) constructing a workload to approximate a running environment (either an application, trace, or synthetic workload), and 2) actually executing the constructed workload to issue I/Os on a target system. Inaccuracies often arise in benchmarking systems in performing the latter aspect (i.e., in replaying traces and generating synthetic workloads). The main assumption in using traces and synthetic workloads to benchmark I/O systems is that the workload being generated is really the one that is applied to the system under test. However, this is often quite difficult to achieve. Timing errors in benchmarking tools can significantly impact measured system parameters. For instance, naive implementations of benchmarking tools, which rely on the operating system (OS) of the benchmarking system to schedule I/Os, could skew the mean inter-I/O issue times by as much as 7 milliseconds (ms) for low I/O loads. This is especially erroneous in the case of high-end storage systems which might have response times in the 100s of microseconds, and can handle tens of thousands of I/Os per second. While such a slight error in timing accuracy may be thought to be of no concern for benchmarking, we have discovered (as detailed later herein) that this deviation in the timing of issuance of I/Os by a benchmarking system can have significant impact on measured system parameters such as the mean device response time.

Accordingly, a general desire exists for improving the accuracy in benchmarking systems. For example, a desire exists for benchmarking tools that are able to generate and issue I/Os with accuracies of about 100 microseconds (µs),

DETAILED DESCRIPTION

Figure 1:
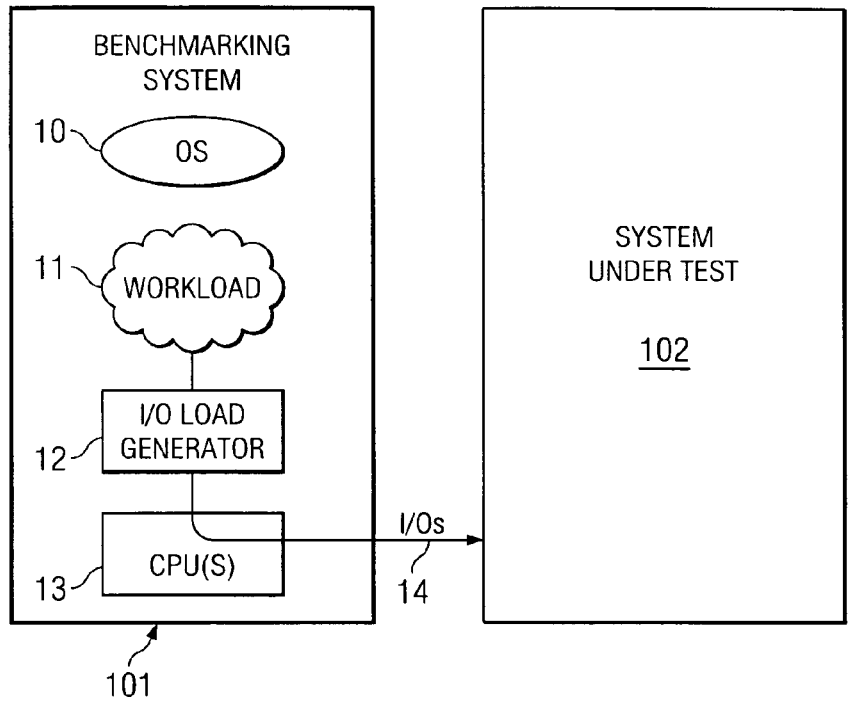
FIG. 1 shows an exemplary system that includes a benchmarking system in accordance with one embodiment of the present invention.

FIG. 1 shows an exemplary system 100 that includes a benchmarking system (or "tool") 101 in accordance with one embodiment of the present invention. Benchmarking system 101 is operable for benchmarking a system under test 102. Benchmarking system 101 includes an OS 10 and one or more CPUs 13. Of course, as one of ordinary skill in the art will readily appreciate, other components not specifically shown for simplicity may be included in benchmarking system 101, including without limitation user interface devices (e.g., keyboard, mouse, display, speakers, microphone, etc.) and data storage mechanisms (e.g., memory, hard drive, peripheral data storage, such as floppy drive, optical drive, tape drive, etc.). One or more workloads 11 are stored to benchmarking system 101. Such workload 11 may comprise a synthetic workload generated by the benchmarking system 101 or by some other tool, or traces collected from a running application to be replayed by benchmarking system 101 back on to the I/O system under test 102, as examples. Benchmarking system 101 further comprises I/O load generator 12 that, as described further herein, is operable to accurately generate I/Os 14 to the system under test 102 in accordance with that defined by workload 11. That is, workload 11 may specify a number of I/Os that are to be generated with specified issue times, and I/O load generator 12 accurately issues the I/Os 14 to the system under test 102 according to the times specified by workload 11. I/O load generator 12 may be implemented as computer-executable software code that is stored to a computer-readable medium (e.g., memory, hard drive, or other data storage mechanism of benchmarking system 101) and executable by CPU(s) 13. As shown in FIG. 1, I/O load generator 12 does not rely on the OS 10 to schedule I/Os 14. Rather, as described further below, I/O load generator 12 is implemented to provide better timing accuracy than is achievable if it relied upon OS 10 for scheduling the I/Os. Thus, while the OS 10 may be used to issue I/Os (e.g., call read/write), OS 10 is not relied upon for scheduling such I/Os.

In certain embodiments, I/O load generator 12 is implemented as a multi-threaded, event driven architecture. Threads (or "workers") are event-driven and utilized to perform various benchmarking tasks, such as determining the patterns of I/Os, keeping track of time, issuing I/Os at appropriate times (according to a specified workload, such as a trace being replayed), and collecting statistics regarding the performance of the system under test 102. As described further below, in certain embodiments, an event queue is implemented in which I/Os to be issued are queued as events in such queue. Further, in certain embodiments, I/O load generator 12 uses a thread to keep track of time using the CPU cycle counter, and determines when the time corresponds to a pending event (e.g., I/O to issue) in the event queue. Thus, the I/O load generator 12 uses the CPU cycle counter to accurately determine the time at which to issue a pending I/O, rather than relying solely on the OS 10 for determining such issue time. As described further herein, this enables improved accuracy in the timing of issuance of I/Os (as measured against the time at which such I/Os are to be issued according to a given workload being used for the benchmarking process) than prior techniques that rely on the OS 10 for scheduling such I/Os. Accordingly, the I/O load generator 12 can be used for accurately replaying traces and generating synthetic workloads for benchmarking system 101.

As described further herein, embodiments of the I/O load generator enable high-performance and high fidelity. As described below, certain embodiments of I/O load generator 12 is multi-threaded and uses events for managing what a particular thread should be working on. Further, the threads are implemented to be capable of processing any type of event, including without limitation issuing an I/O. For instance, certain embodiments are implemented with generic events with subclassing, such as timeout, I/O, and message events. Of course, as described further herein certain embodiments of I/O load generator 12 are general-purpose and enable filaments and messages to be used build any type of event desired to be used in a given benchmarking system. For instance, message events plus standard OS calls may be used in benchmarking a network or other type of system, or explicit network events may be added. In this manner, the general-purpose I/O load generator can be readily adapted for use in benchmarking any type of system, and it may be programmed to trigger actions (e.g., generating loads to a system under test, such as I/Os) based on any desired events defined in the benchmarking system. Filaments may be implemented as objects, lightweight threads, or via other techniques.

Additionally, the I/O load generator uses spin loops and CPU cycle counters for maintaining timing. Further still, certain embodiments of the I/O load generator employ low-latency "bypass locking", as described further below. These and other features described below may be employed in an embodiment of the I/O load generator to achieve high-performance and high fidelity (i.e., accuracy regarding I/O issue times). As further described below, embodiments of the I/O load generator 12 are highly portable, e.g., do not require kernel modification of standard OSs to run and do not use non-standard OS features.

It is surprisingly difficult to achieve in a benchmarking system timing accuracy for low and moderate I/O rates, and even harder for the high rates that enterprise class disk arrays can support. Achieving timing accuracy and high throughput involves coping with three challenges: a) designing for peak performance requirements, b) coping with OS timing inaccuracy, and c) working around unpredictable OS behavior.

First, it is a challenge to design a high performance I/O load generator that can effectively utilize the available CPU resources to generate I/Os at high rates accurately. Existing mid-range and high-end disk arrays have hundreds to thousands of disk drives, which means that a single array can support 100,000 back-end I/Os per second ("IOPS"). The large array caches and the high-speed interconnects used to connect these arrays to the host systems exacerbate this problem: workloads could achieve 500,000 IOPS with cache hits. These I/O rates imply that the I/O workload generators have about a few microseconds to produce each I/O to attain these performance rates. Therefore, it becomes desirable to use multiple CPUs in shared memory multiprocessors to generate these heavy workloads.

Second, the scheduling granularity of most OSs is too large (around 10 ms) to be useful in accurately scheduling I/Os. The large scheduling granularity results in quantization of I/O request initiations around the 10 ms boundary. This is despite the fact that most computer systems have a clock granularity of a microsecond or less. As discussed further below with FIGS. 6A-6B, this quantization effect distorts the generated I/O patterns, and as a result, the observed behavior from the I/O system with a synthetic load generator does not match the observed behavior under application workload.

Third, the complexity of modern non-real-time OSs usually results in unpredictable performance effects due to interrupts, locking, resource contention, and kernel scheduling intricacies. These effects are most pronounced for the shared memory multiprocessor platforms as the OS complexity increases. For example, calling the gettimeofday( ) function on an SMP (Symmetric Multiprocessing) from multiple threads may cause locking to preserve clock invariants, even though the threads are running on separate processors. An alternative is to use the central processing unit (CPU) cycle counters; however, this is also complicated because these counters are not guaranteed to be synchronized across CPUs and a thread moving from one CPU to another has difficulty keeping track of the actual time (or "wall clock time"). For instance, clocks can go backwards, which causes problems in maintaining time across the CPUs.

In general, it is desirable that a benchmarking tool provide the following features:

a) High fidelity: Most I/Os should be issued close (a few microseconds) to their intended issue time (as specified by a workload being processed). Notice that a few microseconds is generally adequate because it takes approximately that much time for stock OSs to process an I/O after it has been issued to them.

b) High performance: The maximum throughput possible should be close to the maximum achievable by specialized tools. For instance, in issuing I/Os as-fast-as-possible (AFAP), the tool should achieve similar rates as tools designed specifically for issuing AFAP I/Os.

c) Flexibility: The tool should be able to replay I/O traces as well as generate synthetic I/O patterns. It should be easy to add routines that generate new kinds of I/O patterns.

d) Portability: To provide optimum usefulness the tool should be highly portable. Specifically, it is desirable that the tool not require kernel modification to run and not use OS-specific features.

Certain embodiments of benchmarking tools are presented herein that achieve the above features. Of course, the concepts presented herein are not limited in application to benchmarking tools that achieve all of the above features, but may in some instances be employed for implementing benchmarking tools that do not achieve one or more of the above features.

In one embodiment, I/O load generator 12 is architected as a multi-threaded event processing system. An example of such an embodiment of I/O load generator 12 is shown in further detail in FIG. 2. In this exemplary embodiment, the logic 201 for describing the I/O access pattern and the functionality 202 for scheduling and executing I/Os are architecturally separated. This separation enables I/O load generator 12 to generate a variety of I/O patterns easily. The "core" of I/O load generator 12 is responsible for actually scheduling and executing I/Os. The core is architected as a multi-threaded event processing system. The individual threads (referred to as "workers") are responsible for issuing the I/Os at the right time, and executing the appropriate I/O generation function to get future I/Os to issue.

This exemplary embodiment can be implemented without requiring any kernel modifications. For instance, this exemplary embodiment can be implemented using POSIX pthreads (see the IEEE POSIX 1003.1c standard (1995)) and synchronization libraries to implement its threads and locking. This makes this exemplary embodiment of I/O load generator 12 very portable, i.e., it can be implemented on benchmarking systems that employ any of a plurality of different OSs 10, including without limitation Unix, Linux, Windows, and HPUX. On the flip side, the performance of this exemplary embodiment of I/O load generator 12 in terms of its maximum throughput and accuracy in issuing I/Os depends on the performance of the underlying OS. That is, OS 10 may provide an ultimate limit on the maximum throughput and accuracy in issuing I/Os, even though the I/O load generator 12 does not rely on the OS 10 for scheduling I/Os. If, for example, OS 10 has locks on the I/O issue path, then even if the I/O load generator 12 makes a call for issuing an I/O at the correct time, the I/O may not out at that time. This happens, for instance, on Linux 2.2, which shares one lock for all devices. The OS can also delay reads/writes, and I/O load generator 12 has no control over such functionality of the OS. However, as described further herein, embodiments of I/O load generator 12 provides a solution that enables improved accuracy in scheduling I/Os of a given workload than has traditionally been achieved through relying on the benchmarking system's OS for scheduling such I/Os, even though the benchmarking system's OS may affect the ultimate performance/accuracy that is achievable. As described further herein, embodiments of I/O load generator 12 perform better than benchmarking systems that rely solely on the OS for scheduling I/Os.

Logic 201 for determining the I/O access pattern is implemented in a collection of objects (e.g., C++ objects), called filaments 20. The filaments translate the workload specification 11 into corresponding events. For example, workload specification 11 may specify to do 100 4 KiB I/Os per second, random location, poisson arrival. Such workload may be a simple trace replay or synthetic workload, or it may be a complex workload, such as provided by the well-known TPC-B benchmark.

The filaments 20 may be written by users and input to I/O load generator 12, and/or a library of filaments 20 for generating common I/O patterns may be stored to I/O load generator 12. As an example, consider the following exemplary library of filaments:

synthetic (I/O size distribution, read/write distribution, offset distribution, inter-arrival time distribution)
synthetic—SPC-1
Trace Replay
TPC-B emulation={transaction filaments, log filaments, background write filaments}.

A Filament is simply an event based lightweight thread, in the same way that most event based systems are designed. In particular, a filament class could be defined (in pseudo C++) as:

class Filament { public:
    //the primary interface to a filament. The filament must define
    //this function, it will be called once with each event that the
    //filament should process. The filament may queue 0 or more
    //additional events via the LoadGeneratorInterface, and then it
    //should return so that the LoadGenerator may process additional
    //work. Unless requested by the filament, at most one thread will
    //call Go( ) at any one time.
    virtual void Go(Event *ev, LoadGeneratorInterface &interface)=0;
    //an optional interface to allow a filament to prepare itself before
    //the load generator starts the clock:
    virtual void Prepare(LoadGeneratorInterface &interface);
};

class LoadGeneratorInterface { public:
    //the function for filaments to queue events:
    void queueEvent(Event *ev);
    //the function to get the current time, the recache option
    //re-gets the actual time, in practice some filaments want
    //to pretend that time stands still while they are processing.
    double curTime(bool recache=false);
    //optional functions to improve performance:
    EventIO *getEventIO( );
    void returnEventIO(EventIO *io);
    void getIOBuf(EventIO *io);
    void returnIOBuf(EventIO *io);
};

The functionality 202 for scheduling and executing I/Os is embedded in threads called workers 21. The implementation of the workers 21 and the interface 23 to filaments 20 forms the "core" of I/O load generator 12. In general, filaments generate events, events are processed as appropriate, as described further herein. In certain embodiments, a call for getting the current time ("get-cur time") and a call for getting an I/O buffer ("get-I/O-buffer") is provided by the interface 23 (see exemplary Load Generator Interface code above), which enables workers 21 to use these calls for their respective functions. Various other calls/functions may be provided by interface 23 as desired for a given embodiment.

Operation of this exemplary embodiment of I/O load generator 12 is event driven. Thus, an event queue 22 is implemented to which events may be queued, as described further herein. Event queue 22 may be implemented as a standard priority queue. In other embodiments, event queue 22 is implemented as two separate event priority queues: one queue for I/O events and another queue for filament events. Further, in certain embodiments, bypass locking is used for accessing such event queue(s), such as the exemplary bypass locking algorithm described in connection with FIGS. 7-9 of co-pending U.S. patent application Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077), the disclosure of which is incorporated herein by reference.

In general, events trigger workers 21 to take some action, such as interacting with the filaments 20, issuing I/Os 14 as defined by the filaments 20, etc. For instance, a filament 20 is called, via interface 23, with the event that triggered a worker 21 to call that filament. The filament 20 then generates additional events to occur in the future, and queues them up in event queue 22. Workers 21 then remove events from the queue 22 at the time the event is to occur, and process them by either calling the appropriate filament 20 at the right time, or issuing the I/O (e.g., I/Os 14 of FIG. 1) if the event represents an I/O. The following are three exemplary types of events that are implemented for this embodiment of I/O load generator 12:

a) Timer events are used to schedule callbacks to filaments at appropriate times;

b) I/O events are used to schedule I/O operations. The event object encapsulates all the information necessary to execute that I/O. The I/O completion events are used by workers to indicate I/O completion to filaments; and c) Messaging events are used to schedule an inter-filament message to be delivered in the future. Messaging events can be used to implement synchronization between multiple filaments or to transfer work, as examples.

Timer and Messaging events are referred to collectively herein as filament events.

Workers 21 are responsible for processing events at their scheduled time. Each worker 21 is implemented as a separate thread so that I/O load generator 12 can take advantage of multiple CPUs 13. Workers 21 wait until an event is ready to be processed, and based on the event they either issue the I/O in the event (such as issued I/Os 14 in FIG. 1), or call the appropriate filament 20.

In this embodiment, the workers 21 maintain the time for determining the time at which to issue an I/O. That is, I/O load generator 12 utilizes the workers 21 to schedule the I/Os to be issued, rather than relying solely on the OS 10 to schedule the issuance of such I/Os. As described further herein, this implementation provides improved accuracy over traditional benchmarking systems that rely on the OS 10 for scheduling the issuance of I/Os. In one embodiment, the last worker 21 to finish processing an event maintains the time until the next event is ready to be processed. In addition, because keeping time using operating system calls, such as gettimeofday( ) (which can be slow and may cause locking) and usleep( ) (which is inaccurate), are undesirably slow and inaccurate, the worker 21 keeps time by "spinning." In this sense, "spinning" refers to executing a tight loop and keeping track of the time. In embodiments of I/O load generator 12, worker 21 keeps track of the time while spinning by using the CPU cycle counter. In certain embodiments, a worker spins for a little time before each event, which is referred to herein as "pre-spin" and is discussed further below. In certain embodiments (referred to as symmetric mode), one worker (thread) is always but the spinning thread (or "spinner") may change from one thread to another (e.g., rotate to another thread), while in other embodiments (referred to as a "low priority spinner mode") the spinner may be a dedicated thread for spinning and waking up other workers when needed in I/O load generator 12. Whichever thread is spinning, such thread maintains time using the CPU cycle counter.

Figure 2:
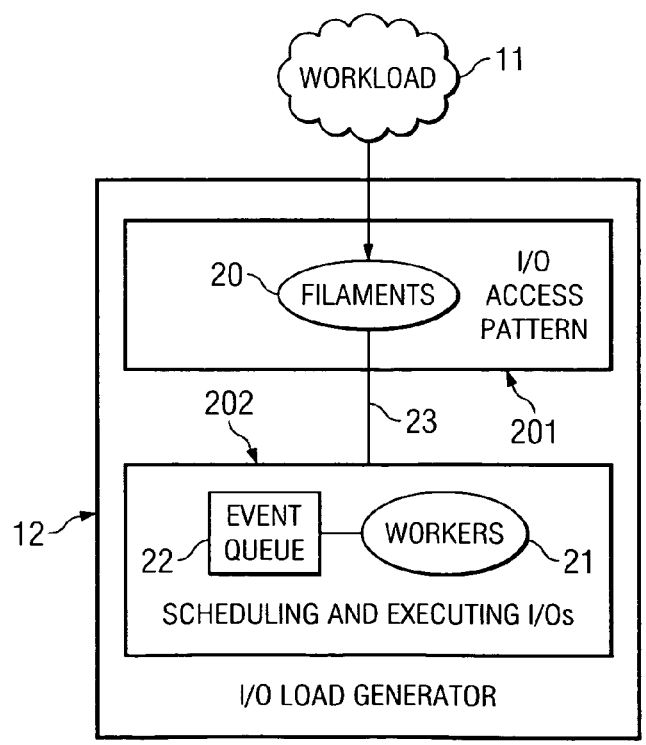
FIG. 2 shows an example of one embodiment of the I/O load generator of FIG. 1 in further detail.
Figure 3A:
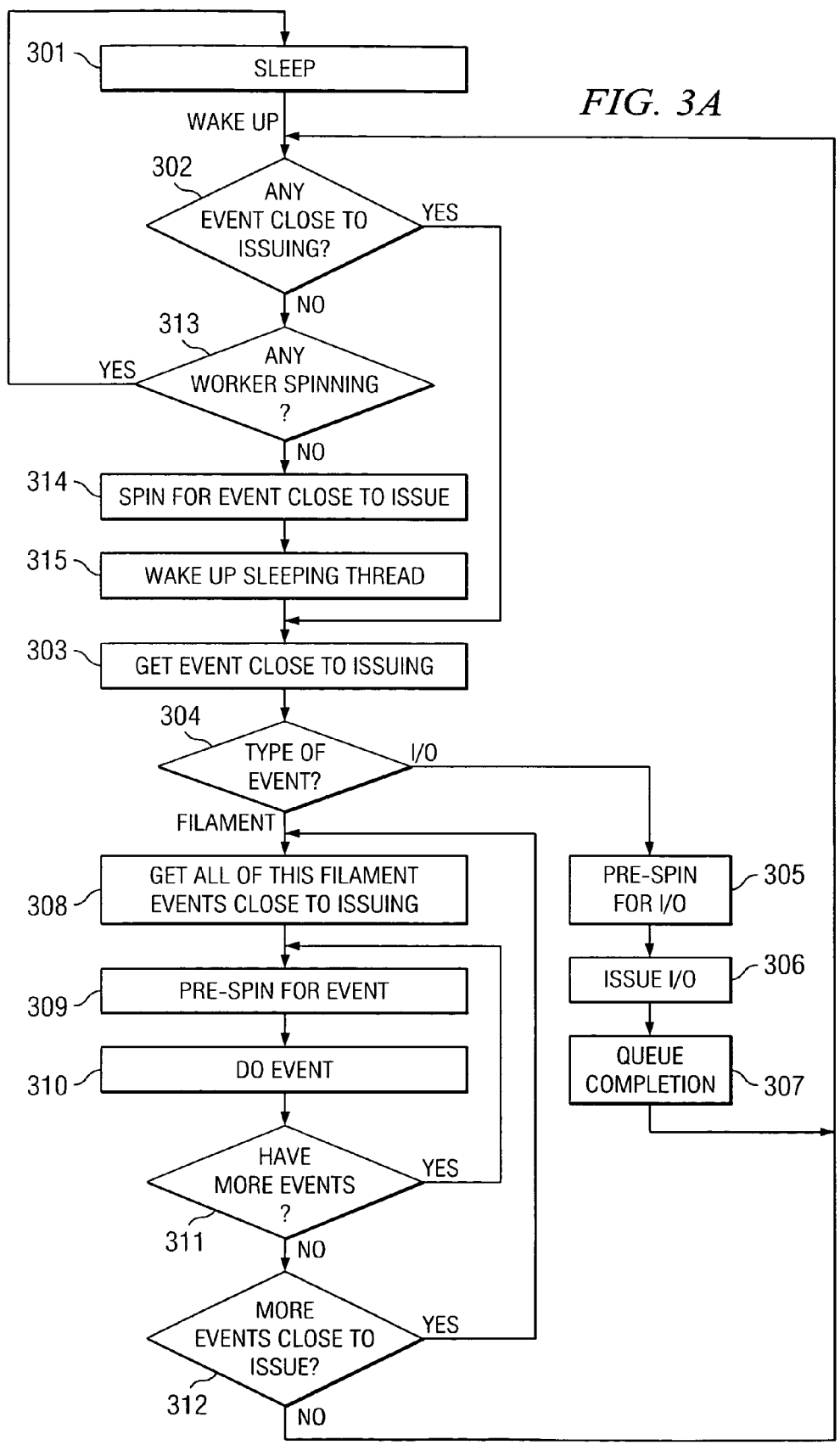
FIG. 3A shows an operational flow diagram of the exemplary embodiment of the I/O load generator of FIG. 2.

FIG. 3A shows an operational flow diagram of a worker 21 in the exemplary embodiment of the I/O load generator 12 of FIG. 2. As shown, a worker may be sleeping in operational block 301, and as described further herein another worker may wakeup the sleeping worker, causing the operation of the awakened worker to advanced to block 302. In block 302, the worker checks the event queue 22 to determine if any event is close to issuing (i.e., if the current time is near the time for an event to issue). In this sense, "close to issuing" refers to an event that is nearing its issue time such that its desired issue time is within a defined pre-spin period, which in certain embodiments may be defined by a user using, for instance, techniques described elsewhere herein. If it is determined that an event is close to issuing, operation advances to block 303 where the worker gets the event that is close to issuing. That is, the worker removes the event that is close to issuing from the event queue 22.

In block 304, the worker determines the type of the event, e.g., whether it is an I/O event or a filament event. If the event that is close to issuing is an I/O event, the worker pre-spins for the I/O in block 305. Such pre-spinning is described further below. The worker issues the I/O in block 306, and queues an I/O completion event on the filament in block 307. Operation then returns to block 302 where the worker again checks whether any event is close to issuing.

If determined in block 304 that the event that is close to issuing is a filament event, operation advances to block 308 where the worker gets all of this filament's events that are close to issuing. As one example, a filament may queue several timer events on itself to perform work in the future, and two or more of such timer events may occur close (in time) to each other. As another example, I/O completions from mixed-mode benchmarking (described further below) may be queued on a filament as "replies" from the I/Os, which may occur near each other in time. As still another example, from time to time there may be some delay in a thread getting to the filament, and so multiple events may be past due. The worker then pre-spins for the event in block 309. Such pre-spinning is described further below. The worker performs the work for the event in block 310. In block 311, the worker determines whether there are more events that the worker obtained in block 308. If so, operation returns to block 309 whereat the worker pre-spins and then performs the work for the next event. If no more events are included in the filament event(s) that the worker obtained in block 308, operation advances to block 312 where the worker determines whether there are any more filament events that are close to issue. If so, operation returns to block 308 and the worker gets all of the filament events that are close to issuing and processes them according to blocks 309-311. If determined in block 312 that no further filament events are close to issuing, the worker's operation returns to block 302.

If determined in block 302 that no event is close to issuing, the worker's operation advances to block 313 where it determines if any other worker is spinning, keeping track of the time using the CPU cycle counter, and waiting for an event to be close to its desired issue time. If so, the worker goes to sleep in block 301. On the other hand, if determined in block 313 that no other worker is spinning, the worker's operation advances to block 314 where it spins for an event that is close to issue. That is, the worker spins and uses the CPU cycle counter to maintain the time, while checking the event queue to determine if any event is close to issuing, as in operational block 302. If determined in block 314 (while spinning) that an event is close to issuing, the worker wakes up a sleeping worker (or "thread") in block 315 (and the awakened worker will follow the operation as described above—advancing from its sleep state in block 301 to operational block 302), and after waking another worker in block 315 operation returns to block 303 and continues as described above.

Figure 3B:
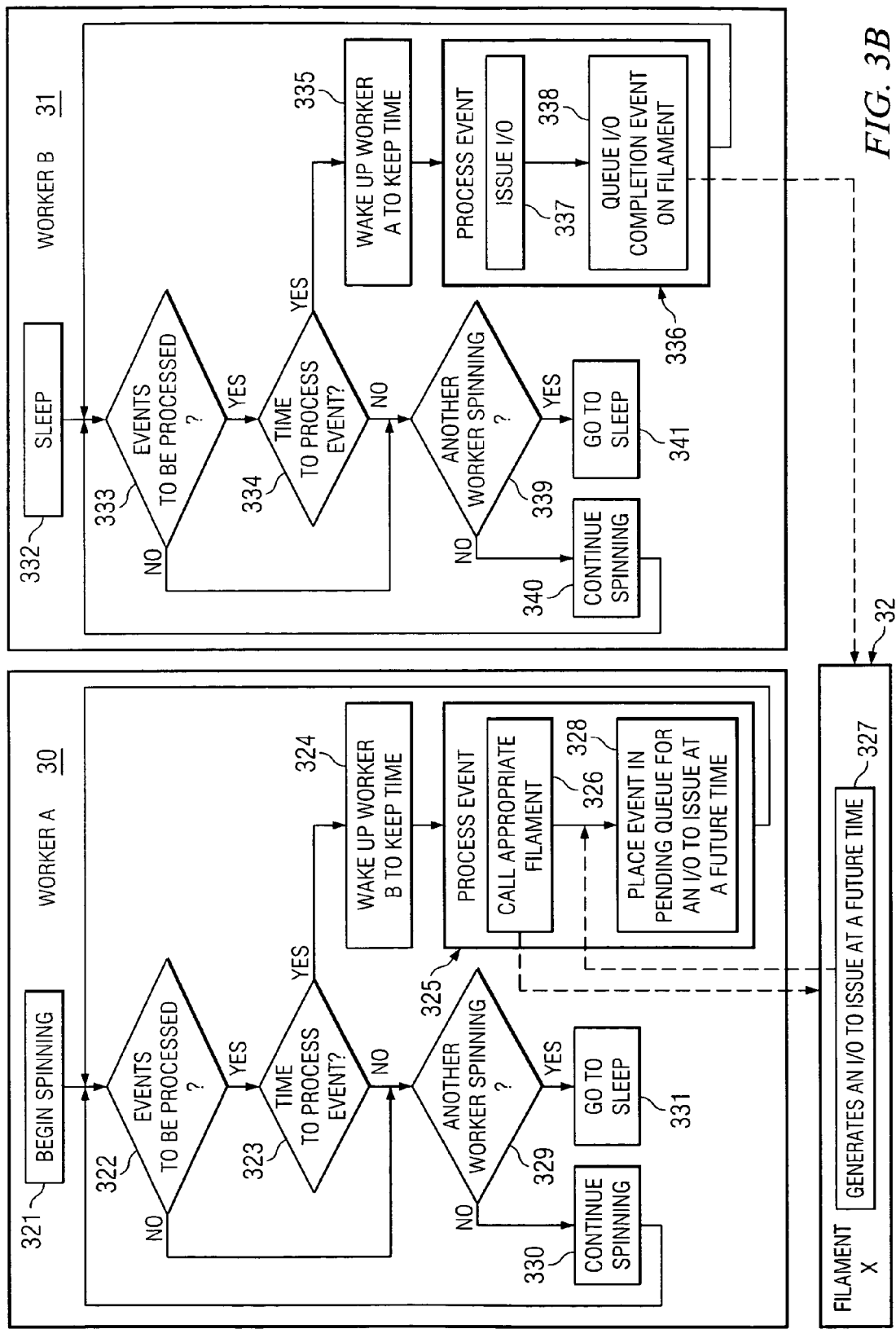
FIG. 3B shows a specific example of operation of the embodiment of the I/O load generator of FIG. 2 for one benchmarking I/O scenario.

Consider now a simple example, shown in FIG. 3B, that illustrates the functions that a worker 21 performs according to this exemplary embodiment. Actions of two exemplary workers (threads) 21, referred to as worker A 30 and worker B 31, are shown in FIG. 3B. Worker A 30 starts by spinning to keep track of the time using the CPU cycle counter in operational block 321, and checking in operational block 322 if there are events to be processed. That is, worker A 30 checks event queue 22 (FIG. 2) to determine if there are any events pending in that queue. If not, worker A 30 advances to block 329, whereat it determines that another worker is not spinning and so it continues spinning in block 330 to keep track of the time using the CPU cycle counter. If determined in block 322 that an event, say a timer event, is pending, worker A 30 determines in block 323 if it is time to process the pending event. If not, worker A 30 advances to block 329, whereat it determines that another worker is not spinning and so it continues spinning in block 330 to keep track of the time.

If determined in block 323 that it is time to process the pending event, worker A 30 wakes up worker B 31 to keep time, in block 324. Any thread may spin for event timeouts in symmetric mode, while the low priority thread always spins for event timeouts in the low priority spinner mode. Thus, the thread waiting for events to be ready to wake other threads may change or not as discussed above, and all threads may use pre-spin, as discussed further herein. Thus, worker B 31 wakes up from block 332. Worker A 30 then processes the timer event in block 325, which in this illustrative example includes calling the appropriate filament, in block 326, which in this example is filament X 32. The event specifies the appropriate filament to that is to be called. Suppose, for instance, that the filament X 32 is called in response to the timer event processed in block 325. In block 327, filament X 32 generates an I/O to execute in the future. In this case, worker A 30 queues the I/O event in event queue 22, in block 328, and then returns to block 322 to check if any events pending in the queue 22 are ready to process. If no events are ready for processing, operation advances to block 329 to determine if another worker is spinning. If another worker is not spinning, operation advances to block 330 whereat worker A 30 continues spinning and it will continue checking the event queue. For example, the event queue 22 maintains the event closest (in time) to issuing at the head of the queue, and the worker A 30 checks the event at the head of the queue to determine if it is near its issue time. However, in this example, because worker B 31 is spinning, worker A 30 goes to sleep in block 331.

Meanwhile worker B 31 is awakened from block 332 by worker A 30 in block 324, and so worker B 31 spins, in blocks 333, 334, 339, 340 until it is determined in blocks 333-334 that it is time to process the pending I/O event that was placed in the event queue in block 328 (or time to process some other pending event). When determined in block 334 that it is time to process the pending I/O event, worker B 31 wakes up worker A 30 in block 335 to begin spinning for keeping time, and worker B 31 processes the event in block 336, which in this instance includes issuing the pending I/O (that was placed in the pending queue in block 328) in block 337. Once the I/O completes, worker B 31 queues an I/O completion event on the filament X 32 in block 338 and goes back to checking for ready events in block 333.

If no events are ready for processing, as determined in either block 333 or block 334, operation advances to block 339 to determine if another worker is spinning. If another worker is not spinning, operation advances to block 340 whereat worker B 31 continues spinning. However, if another worker is spinning, such as if worker A 30 is spinning as a result of block 335, worker B 31 goes to sleep in block 341. The above procedure continues until there are no events left pending in the queue and there, are no outstanding I/Os to be issued.

Figure 4:
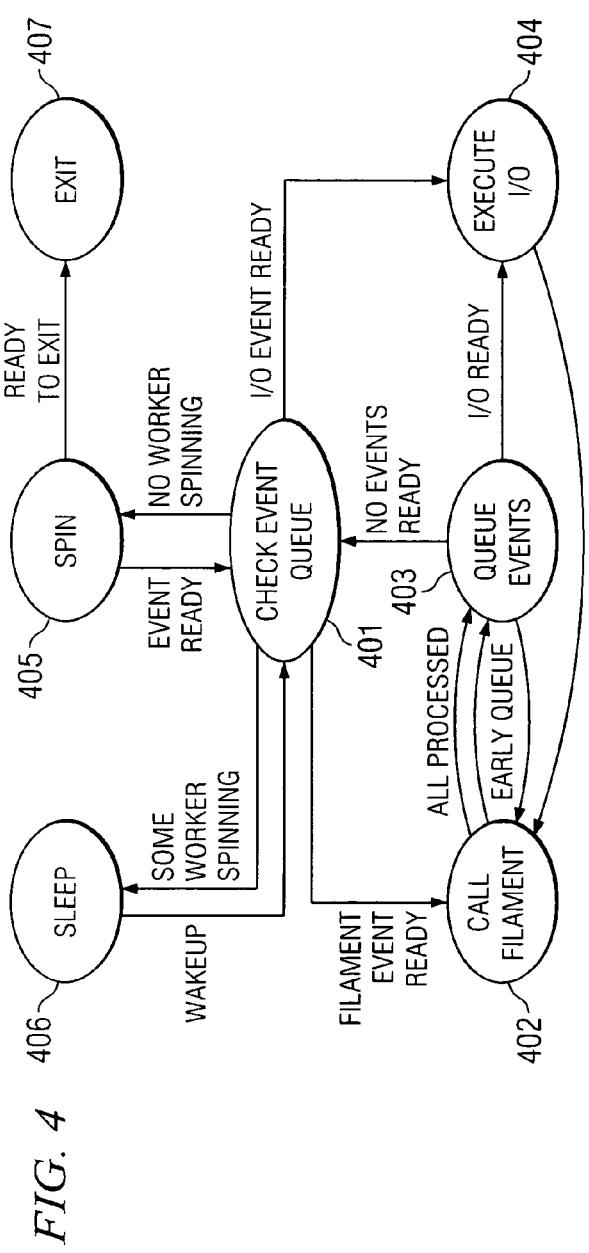
FIG. 4 shows a generic state transition diagram for the exemplary embodiment of the I/O load generator of FIG. 2.

While an operational flow diagrams for one embodiment of I/O load generator 12 is shown in FIGS. 3A-3B above, the operation of such embodiment is generalized with the exemplary generic state transitions shown in FIG. 4. In this example, 7 states are shown, labeled 401-407, which are states that a given worker (thread) may have. The states are each described further below.

The check event queue state 401 is the central dispatch state. In this state, the worker determines if a filament is runnable, or if an I/O is issuable, and transitions to the appropriate state to process the filament or I/O. It also wakes up another worker to replace itself to guarantee a worker will be spinning. If no event is ready, the worker either transitions to the spin state 405 or the sleep state 406 based on whether another worker is already spinning.

The call filament state 402 is a state in which the worker calls a filament. The worker enters this state (i.e., calls the filament) when either a filament event (timer/messaging event) is ready, or when an I/O completes. The filament called may generate more events. Once all the ready events are processed, the worker transitions to the "Queue Events" state 403 to queue the events the filament generated. The worker may queue events while processing filament events ("early queue") to avoid waiting for all events to get processed for slow filaments.

In the queue events state 403, the worker queues events which were generated by a filament. If none of those events are ready, the worker transitions into the "check event queue" state 401. If any of the events is ready, the worker transitions directly to processing it: either issuing the I/O (in state 404) or calling an appropriate filament (in state 402).

In the execute I/O state 404, the worker executes a ready I/O event. Because implementations of asynchronous I/O on existing OSs are poor, this embodiment of I/O load generator 12 uses synchronous I/O, and hence the worker blocks for I/O completion. However, if an appropriate implementation of asynchronous I/O is or becomes available, such asynchronous I/O could be implemented on I/O load generator 12. Once the I/O completes, the worker transitions directly to calling the appropriate filament (in call filament state 402) with the completed I/O event.

The worker enters the spin state 405 and starts "spinning" when, after checking the event queue for events to process (in state 401), it finds that there are no ready events and no other spinning worker. When spinning, the worker constantly checks the event queue (i.e., transition to check event queue 401), as it is in a tight loop examining the various queues. According to certain embodiments, locking of the queues is managed for the threads using a bypass locking scheme, such as the exemplary bypass locking algorithm described in connection with FIGS. 7-9 of co-pending U.S. patent application Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077), the disclosure of which is incorporated herein by reference. The worker uses a CPU cycle counter for keeping time while spinning. CPU cycle counters move forward with each cycle of the CPU. The spinning worker gets the time either before each complete check of all queues or before checking each queue.

The worker enters the sleep state 406 when, after checking the event queue for events to process (in state 401), it finds that there are no ready events and there is some other spinning worker. To prevent deadlock, I/O load generator 12 ensures that not all workers go to sleep. Recall that in this exemplary embodiment of I/O load generator 12, there is no single thread that is responsible for dispatching events; but rather, the functionality is distributed among the workers. Hence, if all the workers went to "sleep", there will be a deadlock. Instead, one of the workers always spins, periodically checking if the event at the head of the central queue ("event queue") is ready to be processed. A call from another worker may wake up a sleeping worker.

When the event queue is empty and all other workers are asleep, the spinning worker wakes one thread up and exits (state 407). The rest of the workers repeat this process until all threads exit. In this sense, "exit" means that the program is stopping versus going to sleep (where the program is waiting).

The above exemplary embodiment of I/O load generator 12 may be implemented to enable a user to utilize it for benchmarking in either of two ways: a) configure and run predefined library filaments, and b) implement new workloads by implementing new filaments. That is, I/O load generator 12 may be implemented with a pre-defined library of filaments stored thereto for generating certain I/O patterns (e.g., commonly used I/O patterns), which the user can employ in benchmarking a system under test. Further, I/O load generator 12 may be implemented such that it is capable of receiving (and storing for use in benchmarking) user-defined filaments, such as filaments corresponding to a given generated synthetic workload and/or collected I/O traces to be replayed during benchmarking.

In one embodiment, there exist several classes. The load generator takes an input file that specifies a class and options. This creates an object, which is referred to herein as a filament. The filament may create more filaments. The user may also have dynamically loaded classes.

As an example, I/O load generator 12 may be implemented to include filaments that: a) implement simple synthetic benchmarks with user-specified distributions for I/O size distribution, read/write distribution, offset distribution, and inter-arrival time distribution, b) implement complex benchmarks, such as SPC-1, c) replay an I/O trace that was collected for given application and input by a user, and d) approximate benchmarks such as the well-known TPC-B (available from the transaction processing performance council).

To support programming new filaments, one implementation of I/O load generator 12 exports a simple single threaded event-based programming interface. All the complexity of actually scheduling, issuing, and managing events is completely hidden from the filaments. The programmer implements only the logic for deciding what event to generate next in a desired workload. Programmers may synchronize between filaments using message events.

To allow for shared and slow statistics, one implementation of I/O load generator 12 uses the same event processing core to pass I/O completion events to filaments which are dedicated to keeping statistics. For instance, in the example of FIG. 3, when worker B 31 calls filament X 32 with the completed I/O in block 318, such worker B 31 may also pass the I/O completion to another filament (not shown) that is dedicated to keeping statistics for use in benchmarking the system under test. The set of statistics for the I/O load generator 12 to keep may be specified at run time in a configuration file, which causes the I/O load generator 12 to build up multiple statistic filaments that may be shared by I/O generating filaments. In certain embodiments, a user may input information specifying the statistics to maintain, which in turn generates the corresponding configuration file to be used during benchmarking.

Some statistics, such as mean and standard deviation are easy to compute, while other statistics such as approximate quantities (see G. S. Manku, S. Rajagopalan, and B. G. Lindsay, "Approximate medians and other quantities in one pass and with limited memory", *Proc. Of the* 1998 *ACM SIGMOD Intl. Conf. on Management of data*, pages 426-435, 1998) or recording a full I/O trace can potentially take much longer due to occasional sorting or disk write. For this reason, one implementation of the above embodiment separates the steps of 1) generating I/Os, which is to run sufficiently fast that I/Os reach the core before their issue time, and 2) generating statistics, which can be computed independent of the I/O processing.

In one embodiment of I/O load generator 12, information regarding each I/O, such as issue time, completion (response) time, etc., is copied into a collection buffer in a filament, without computing the desired statistics. Once the collection buffer is full, it is sent to a "statistics thread" using a messaging event. This allows the I/O generation filament to run quickly, and it improves the efficiency of computing statistics because multiple updates are batched together.

In view of the above, exemplary embodiments of an I/O load generator 12 are provided that can be used to issue pre-recorded traces accurately or generate a synthetic I/O workload. Certain embodiments of I/O load generator 12 can issue almost all I/Os within a few tens of μs of the target issuing time (as specified by the workload being processed). Further, embodiments of I/O load generator 12 can be built completely in user space to improve portability. An exemplary embodiment of I/O load generator 12 provides a simple interface for programmatically describing I/O patterns, which allows generation of complex I/O patterns and think times. I/O load generator 12 can also replay traces accurately to reproduce workloads from realistic environments.

It should be noted that while the above exemplary embodiments, and the further discussion provided herein below are directed to an I/O load generator, the concepts herein are not limited in application to an I/O load generator but may be readily applied in other types of load generators for generating appropriate loads in accordance with a desired workload for benchmarking a system under test. For instance, the concepts presented herein may be employed to form a general-purpose benchmarking system that can be readily adapted for generating a load for benchmarking any type of system, including without limitation network benchmarking, CPU benchmarking, memory benchmarking, graphics benchmarking, and server benchmarking (e.g., database server benchmarking, web server benchmarking, etc.).

Optional Optimizations

The exemplary architecture described above may be optimized in various ways to achieve the desired high throughput and low issue-error such as may be desired for benchmarking a high-end enterprise storage array. For instance, some implementation questions that may be addressed for optimizing performance of the benchmarking system may include:

How to minimize latency for accessing shared data structures?

How to ensure that time critical events get processing priority?

How to minimize the impact of a non real-time OS with unpredictable system call latencies and preemption due to interrupts?

How to synchronize timing between the multiple CPUs on an SMP which is to achieve high throughput?

How to work around the performance bottlenecks due to the compiler and programming language with out sacrificing portability?

How to identify performance bottlenecks?

Exemplary techniques for addressing each of the above questions for optimizing performance are described below. Various embodiments of the benchmarking system of the present invention may include any number of the below-described techniques as may be desired. Of course, the concepts presented herein are not limited in application to benchmarking tools that implement the exemplary optimization techniques described below, but may in some instances be employed for implementing benchmarking tools that do not employ one or more of the below-described optimization techniques.

The first question identified above is: "How to minimize latency for accessing shared data structures?" Shared data structures are to be protected by locks. However locks cause trains of workers, contending on the lock, which builds up increasing latency. Additionally, interrupts can force locks to be held longer than expected. Worse, we have observed that on Linux, with the default 2.4 threads package, it takes about 10 times longer to release a lock if another thread is waiting on it. Therefore, it becomes desirable to a) minimize waiting on shared locks, b) minimize the time spent in the critical section, and c) minimize the total number of lock operations. One embodiment of I/O load generator 12 addresses the locking problems using bypass locking, such as described in co-pending U.S. patent application Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077) and U.S. patent application Ser. No. 11/094,554 titled "SYSTEM AND METHOD FOR DYNAMICALLY DETERMINING A THREAD TO PERFORM WORK USING A LOCKABLE RESOURCE" filed Mar. 30, 2005 (now U.S. Patent Publication No. 2006/0225078, the disclosures of which are hereby incorporated herein by reference. Such bypass locking allows a thread to bypass locked data structures to find something useful to do, reduce the critical section time by pairing priority queues with dequeues, and minimize lock operations using filament event batching and carried events, as described further below.

The event queues 22 (see FIG. 2), where workers 21 queue and pick events to process, are shared data structures and accesses to these queues is protected by locks. Hence, to reduce the number of lock operations, one embodiment of I/O load generator 12 tries to avoid queuing events on these central structures if possible, and attempts to process events in batches.

Accordingly, in such an embodiment, workers 21 get new events in the queue-events state (state 403 of FIG. 4) or the execute-I/O state (state 404 of FIG. 4), and process events that are ready to be processed in the execute-I/O 404 or call-filament 402 states. To minimize lock operations, one embodiment of I/O load generator 12 enables workers 21 to carry, without any central queuing, events that are ready to be processed directly from the queue-events state 403 to the execute-I/O 404 or call-filament 402 states, or from the execute-I/O 404 to the call-filament state 402. This simple optimization directly reduces the number of lock operations. Workers 21 of this embodiment prefer to carry I/O events over other events that could be ready, because I/O events are the most time critical.

When processing filament events, workers 21 remove all of the ready events in a single batch, according to one embodiment of I/O load generator 12. This allows a worker 21 to process multiple filament events with just one lock acquisition (recall that a filament is single threaded and thus locked by the worker executing it). To enable such batch processing, one embodiment of I/O load generator 12 keeps a separate event queue 22 for each filament 20, rather than placing the events in a central priority queue, which would tend to intermingle events from different filaments. To enable such distributed (per filament) queues, while still allowing for a centrally ordered queue, what is stored centrally is a hint that a filament 20 may have a runnable event at a specified time, rather than the actual event. In this sense, such a "hint" may be implemented as a structure of: (event time, filament). This may be considered a "hint" because some other thread may have already handled the actual event. Workers thus skip hints which correspond to events that have already been processed when working through the central queues.

The same optimization is not performed for I/O events because unlike filament events, I/O events cannot be batched in one embodiment of I/O load generator 12. In such embodiment, I/O load generator 12 uses synchronous I/O because support for asynchronous I/O is inadequate and lacking in performance on stock OSs. However, because I/Os happen frequently and are time critical, I/O load generator 12 may be implemented to use different queues for the pending hints and pending I/O events, and directly store the I/O events in their own priority queue.

Though removing an element from a priority queue is theoretically only logarithmic in the length of the queue, when shared between many separate threads in a SMP, each of those operations becomes a cache miss. To alleviate this problem, in one embodiment of I/O load generator 12 a priority queue is paired with a dequeue, and a thread moves all of the ready events into the dequeue. This benefits from the fact that once the queue is searched for a ready event, all the requisite cache lines are already retrieved, and moving another event will cause very few additional cache misses. Removing an entry from the double-ended queue only takes at most two cache misses: one to get the entry and one to update the head pointer. This combination minimizes the time in critical sections when bursts of events are to be removed from the priority queues.

While the above techniques minimize the number of lock operations and the time spent in critical sections, at high load it is likely that a thread will get interrupted while holding one of the filament hint or I/O locks. If there are multiple runnable events, it is desirable that the thread remove one of the other events and continue processing, rather than waiting on a single lock and incurring the high wakeup penalty. Therefore, one embodiment of I/O load generator 12 partitions the hint queue and the I/O queues. When queuing events, the worker 21 tries each of the queues in series, trying to find one which is unlocked, and then putting events on that one. If all the queues are locked, it will wait on one of the locks, rather than spin trying multiple ones. When removing entries, the worker 21 first checks a queue-hint to determine if it is likely that an entry is ready, and if so, attempts to lock the queue and remove an entry. If the lock attempt fails, it continues on to the next entry. If the worker finds no event, and could not check one of the possibilities, it will wait on the unchecked locks the next time around. An example of such a bypass locking technique that may be employed is described further in co-pending U.S. patent application Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077) (e.g., in connection with FIGS. 7-9 thereof).

This bypass locking technique generally minimizes the amount of contention on the locks. Our measurements indicate that going from one to two or three queues will reduce the amount of contention by about a factor of 1000, greatly reducing the latency of accessing shared data structures. However, at very high loads, we still found that workers were forming trains, because they were accessing the different queues in the same order, so in certain embodiments each worker may pick a random permutation order to access the queues; this increases the chance that with three or more queues two workers which simultaneously find one queue busy will choose separate queues for trying next.

In certain embodiments of I/O load generator 12, a similar technique is used for managing the pool of pages for data for I/Os, except that in this case all threads check the pools in the same order, waiting on the last pool if necessary. This is because the I/O load generator 12 caches I/O buffers in workers 21, and so inherently have less contention, and by making later page pools get used less, less memory can be pre-allocated for those pools. An example of such a bypass locking technique that may be employed is described further in co-pending U.S. patent application Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077) (e.g., in connection with FIGS. 4-6 thereof).

As described above, I/O load generator 12 can be implemented to run on stock OSs and multiprocessor systems. Further as described in co-pending U.S. patent application Ser. No. 11/093,827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006/0225077) and U.S. patent application Ser. No. 11/094, 554 titled "SYSTEM AND METHOD FOR DYNAMICALLY DETERMINING A THREAD TO PERFORM WORK USING A LOCKABLE RESOURCE" filed Mar. 30, 2005 (now U.S. Patent Publication No. 2006/0225078, the above-mentioned bypass locking techniques may be implemented using standard locking primitives and are thus portable to stock OSs and multiprocessor systems. To run on stock OSs and multiprocessor systems, it becomes desirable for I/O load generator 12 to work around delays in system calls, occasional slow execution of code paths due to cache misses, and problems with getting accurate, consistent time on multiprocessor systems, which are addressed below.

There are three sources of delay between when an event is to be processed and when the event is actually processed: a) a delay in the signal system call, b) a scheduling delay between when the signal is issued and the signaled thread gets to run, and c) a delay as the awakened thread works through the code-path to execute the event. Pre-spinning and low priority spinners are techniques employed in certain embodiments of I/O load generator 12 to address these problems.

Pre-spin is a technique whereby I/O load generator 12 starts processing events "early", and performs a short, unlocked spin right before processing an event to get the timing entirely right. This pre-spin is used because the thread wake-up and code path can take a few 10 s of microseconds (μs) under heavy load. By setting the pre-spin to cover 90-99% of that time, this embodiment of I/O load generator 12 can issue events much more accurately, yet only spin for a few μs. Naturally, setting the pre-spin too high results in many threads spinning simultaneously, leading to undesirable issue error, and low throughput. An appropriate pre-spin may be measured by running a benchmark with no pre-spin and using quantile issue error statistics. At the end of the run, the statistics may be examined to determine the 90-99% and the pre-spin may be set to that value. In certain embodiments, this value may be dynamically determined.

Pre-spin mostly covers problems (a) (i.e., a delay in the signal system call) and (c) (i.e., a delay as the awakened thread works through the code-path to execute the event), but unless threads are run as non-preemptable, even the tight loop of while (cur_time( )<target_time) { } will very occasionally skip forward by substantially more than the <1 μs that it takes to calculate cur_time( ). This may happen if a timer or an I/O completion interrupt occurs. Since these are effectively unavoidable, and they happen infrequently (less than 0.01% at reasonable loads), this embodiment of I/O load generator 12 simply ignores them.

If the spinning thread is running at the same priority as a thread actively processing events, then there may be a delay in scheduling a thread with real work to do unless the spinning thread calls sched_yield( ). Unfortunately, calling sched_yield( ) can still impact the scheduling delay because the spinning thread is continually contending for the kernel locks governing process scheduling. Low priority spinners solve this problem by reprioritizing a thread as lowest priority, and only allowing it to enter the spin state. This thread handles waking up other threads, and is quickly preempted when an I/O completes because it is low priority and so does not yield.

In certain embodiments, a spinning thread uses CPU cycle counter for keeping track of time, such as described in the paper entitled "Using a CPU cycle counter to estimate the time of day", attached hereto as Appendix A, the disclosure of which is hereby incorporated herein by reference. Typically, in event processing systems, there is an assumption that the different event processing threads are clock synchronized. Though this is always true on a uniprocessor system, clock skew on multiprocessors may affect the system substantially. This is especially tricky when one relies on CPU clock counters to get the current time quickly. In one embodiment of I/O load generator 12, each worker 21 maintains its own time, resynchronizing its version of the time with gettimeofday( ) infrequently, or when changes in the cycle counter indicate the worker has changed CPUs. Thus, time is resynchronized when a thread wakes up. However, small glitches in timing could result in incorrect execution. Consider, for example, the following situation: worker 21A with a clock of 11 μs is processing a filament event when worker 21B with a clock of 15 μs tries to handle an event at 15 μs. Since the filament is already running, worker 21B cannot process the event, but it assumes that worker 21A will process the event. However, worker 21A thinks the event is in the future, and so with the hint removed, the event may never get processed. Accordingly, if not accounted for, this tiny 4 μs clock skew can result in incorrect behavior. A solution implemented in certain embodiments of I/O load generator 12 is for workers to mark filaments with their current clock, so that interworker clock skew can be fixed. The problem occurs rarely, but it is desirable to handle it for complete correctness.

One of the well known problems with the standard template library (STL) of C++ is the abstraction penalty (see A. D. Robison, "The Abstraction Penalty for Small Objects in C++", *Parallel Object-Oriented Methods and Applications* '96, Santa Fe, N. Mex., February 1996), the ratio of the performance of an abstract data structure to a raw implementation. One embodiment of I/O load generator 12 encounters the abstraction penalty in two places: 1) priority queues and 2) double-ended queues. The double-ended queue is traditionally implemented with a tree, which keeps the maximum operation time down at the expense of slower common operations. Using a standard circular array implementation makes operations faster at the expense of a potentially slow copy when the array has to be resized. Similarly, a re-implementation of the heap performed approximately 5× faster than STL for insertion and removal when the heap is empty, and about 1.2× faster when the heap is full (on both HPUX and Linux with two different compilers each). The only clear difference between the two implementations was that STL used abstraction much more (inserting a single item nested about eight function calls deep in the STL, and one in the rewrite).

Other performance problems were due to operations on "long long" type, such as mod and conversion to double. The mod operation may be used, for example, in quantization. A solution implemented in one embodiment of I/O load generator 12 is to observe that the quantized values tend to be close to each other, and therefore, I/O load generator 12 can calculate a delta with the previous quantized value (usually only 32-bits long) and use the delta instead followed by addition.

Locating bottlenecks in I/O load generator 12 is challenging because many of them only show up at high loads. Certain embodiments of I/O load generator 12 address this with two approaches. First, counters and simple two-part statistics along many important paths may be implemented. The two-part statistics track "high" and "low" values separately for a single statistic, which is still fast, and allows the I/O load generator 12 to identify instances when variables are beyond a threshold. This may be used, for example, to identify the situations when a worker picks up an event from the event queue before the event should happen or after; or the times when few (say less than 75%) of the workers are active.

Second, a vector of (time, key, value) trace entries that are printed at completion may be implemented. These trace entries allow I/O load generator 12 to reconstruct, using a few simple scripts, the exact pattern of actions taken at runtime. The vectors are per worker, and hence lock-free, leading to low overhead when used. The keys are string pointers, allowing I/O load generator 12 to quickly determine at runtime if two trace entries are for the same trace point, and optionally collapse the entries together (desirable, for example, for tracing in the time-critical spin state).

The counters and statistics identify which action paths should be instrumented when a performance problem occurs, and the trace information allows I/O load generator 12 to identify which parts of those paths can be optimized.

Further, certain embodiments of I/O load generator 12 enable use within a mixed-mode benchmarking system. That is, I/O load generator 12 may be employed to enable a benchmarking system to simultaneously execute against simulated and real devices with the performance of each type of device to affect the workload seen by each device. As described above, in certain embodiments, an event-passing structure is employed with support for real threads that are used in I/O load generator 12. This provides a standard structure of almost all simulators which use events to handle the simulation. Also, filaments (lightweight cooperatively shared "threads") for simulated devices may be created. These are filaments that accept an event of type io_request, perform some processing on it, and then queue an event of type io_reply, in exactly the same way that the actual I/O execution code handles those events. Further, the event queueing state may be implemented such that I/O requests that should be handled by a simulation filament are directed to that filament instead of to the I/O processing stage. These features of an exemplary embodiment of I/O load generator 12 provides a benchmarking system that can perform several different things. First, it can simply emulate a device by delaying the I/O the amount of time that it should be delayed. This option may be implemented by calculating when the I/O would complete, and re-queuing the event as an io_reply with an event time of the I/O completion time. Second, it can act as some sort of controller, for example splitting up requests to emulate some sort of RAID level, simulating a read or write cache, and queuing a number of subordinate I/O requests. Finally, it can combine these things in order to simulate a more complicated device, such as one that dynamically re-provisions storage between a fast MRAM device and a slower disk array.

In certain embodiments, the I/O load generator is implemented such that the benchmarking system has the ability to inter-mix different workload types, for example running a trace replay, an emulated TPC workload, and a simple sequential read (to simulate a backup) at the same time. The different workload types could even send events to each other to control how and when they execute. The mix of workload types is made more interesting in combination with filaments what simulate controllers that manage Quality of Service for I/Os, for example. Thus, in certain embodiments, the I/O load generator 12 can simultaneously execute a workload against both a real and simulated device with the simulation entirely within the application.

Recognition of Need for High I/O Issue Accuracy

As discussed above, traditional benchmarking tools, such as implementations that rely on the benchmarking system's OS to schedule I/Os, introduce errors in I/O issue times. The impact of errors in issuing I/O at the designated time on measured application statistics can be quantified. In doing so, "issue-error" is defined as the difference in time between when an I/O is intended to be issued and when it is actually issued by the benchmarking tool. One may intuitively feel that I/O benchmarks can adequately characterize applications despite timing inaccuracies in issuing I/O, as long as the remaining characteristics of the workload, such as sequentiality, read/write ratio, and request offsets are preserved. In fact, prior studies of system benchmarking seem to assume that the issue accuracy achieved by using standard system calls is adequate. However, our measurements indicate that this is not the case and that errors in issuing I/Os can lead to substantial errors in measurements of I/O statistics such as mean latency and number of outstanding I/Os.

Figure 5:
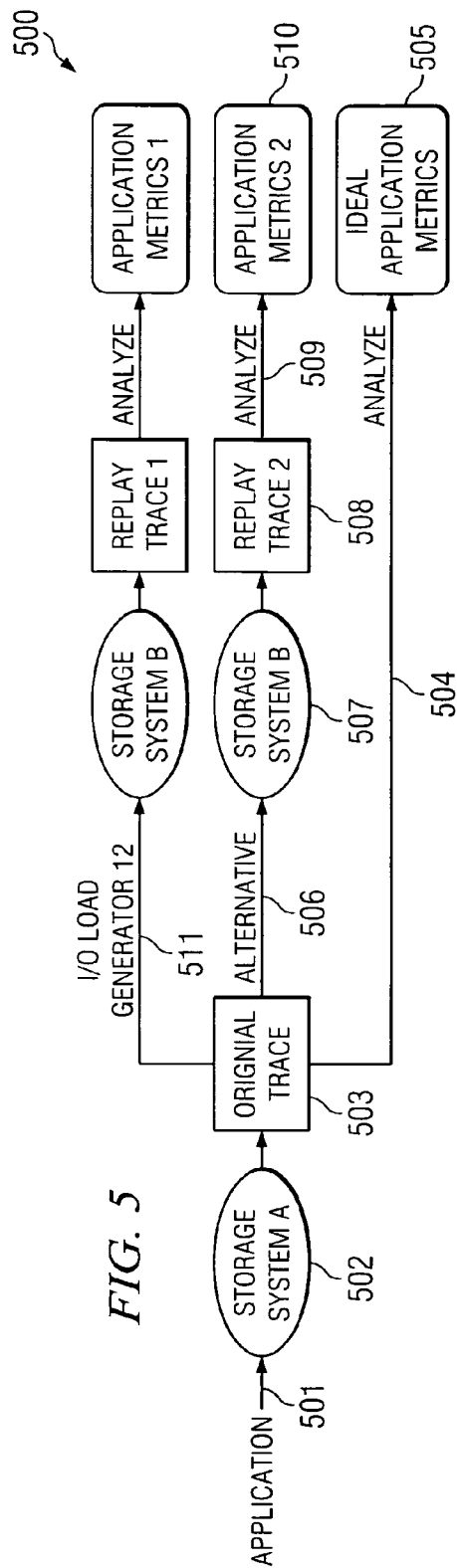
FIG. 5 shows an exemplary methodology used for evaluation of the impact of errors in issuing I/Os for benchmarking.

FIG. 5 illustrates an exemplary methodology used for evaluation of the impact of errors in issuing I/Os for benchmarking. That is, FIG. 5 shows an experimental methodology 500 that was used to compare performance of different trace replay techniques. This exemplary methodology uses I/O trace replay to evaluate different mechanisms of I/O scheduling, each attempting to issue the I/Os as specified in an original trace 503. Thus, the input is the original trace 503 of an application 501 running on storage system A 502. So, storage system A 502 is a storage system that is used for executing application 501 to generate the original trace 503 (or "workload") for the application (e.g., under an actual workload experienced over a period of time), and such storage system A 502 may be the same as storage system B, or it may be a different storage system that is used for collecting the original trace 503. The original trace 503 contains information on both when I/Os were issued and when the responses arrived. The trace 503 is then replayed on storage system B 507 (i.e., a storage system being benchmarked) using different trace replay techniques 506 and 511. The resulting I/O trace (replay traces) are gathered for each of the different trace replay techniques used. That is, during trace replay by a benchmarking technique (506, 511), another trace is collected, called the replay trace (508, 512), which includes the responses to the replayed I/Os. In the illustrated example of FIG. 5, replay trace 508 is gathered for trace replay technique 506, and replay trace 512 is gathered for trace replay technique 511. The resultant replay traces 508 and 512 are analyzed (509, 513) to compute statistics on I/O metrics (510, 514) of interest to the application 501, such as response times and queue lengths. These metrics (510, 514) are used to compare the different trace replay techniques (506, 511) with each other, as well as with the original trace 503 if the storage systems A and B were the same.

It should be noted that the I/O behavior of an application 501 depends upon the storage system; hence the I/O trace of the application running on system A 502 is generally quite different from the I/O trace on system B 507 (assuming systems A and B are different). The I/O issue times are expected to be similar if the replay program is accurate, though the response time statistics and I/O queue sizes on system B 507 are likely to be different. In practice, benchmarking rarely uses the actual application 501 on system B 507 (e.g., due to set up costs, etc.); for rare cases in which the application 501 could be run on system B 507, a replay trace for such application 501 running on system B 507 can be collected and analyzed 504 running the application 501 to compute an ideal baseline of metrics 505. The results of the analysis of the different replay traces between each other and to the results of the analysis of the ideal trace can be compared to evaluate the impact of I/O issue accuracy on the storage system performance metrics.

We have conducted experiments using four different mechanisms to replay the original trace 503 on the storage system B 507. All programs used in these experiments were multi-threaded and used the pthreads package. We issued I/Os synchronously, one per thread, and all programs used the same mechanism for I/O issue. As discussed below, the most accurate of these benchmarking programs was an embodiment of the I/O load generator 12 described above. The other three programs are briefly described below.

The first two programs, referred to herein as "SELECT" and "SLEEP," used standard OS mechanisms to schedule and issue I/Os (select( ) and usleep( ) system calls, respectively) to wait until the time for an I/O issue to arrive. Each of these had a number of worker threads to issue I/Os and a master thread that hands I/Os to available worker threads. Once a worker thread is assigned to issue an I/O, it sleeps using either the select( ) or the usleep( ) call, and the OS scheduler wakes the worker when the time for the I/O arrives. These two programs rely entirely on standard OS mechanisms to keep the time and issue the I/Os, and hence their accuracy is determined by the scheduling granularity of the underlying OS.

The third program, referred to herein as "DED-CLOCK," uses a dedicated clock thread and CPU cycle counters to schedule the I/Os. The clock thread spins continuously and wakes up worker threads at the appropriate times and hands them I/Os to issue. The CPU cycle counters are usually much more precise than the standard OS timers, but the throughput of this approach depends on how fast the clock thread can wake up workers to issue I/Os.

These three programs are simple approaches of how one might architect a trace-replay program using existing mechanisms. In general, a problem with these approaches is that the accuracy of I/O scheduling is contingent upon the thread being scheduled at the right time by the OS. As a result, they are unable to replay I/O bursts accurately and tend to either cluster I/Os at OS scheduling boundaries or flatten bursts. Further, these approaches do not provide the generality/portability provided by certain embodiments of the above-described I/O load generator 12.

Figure 6A:
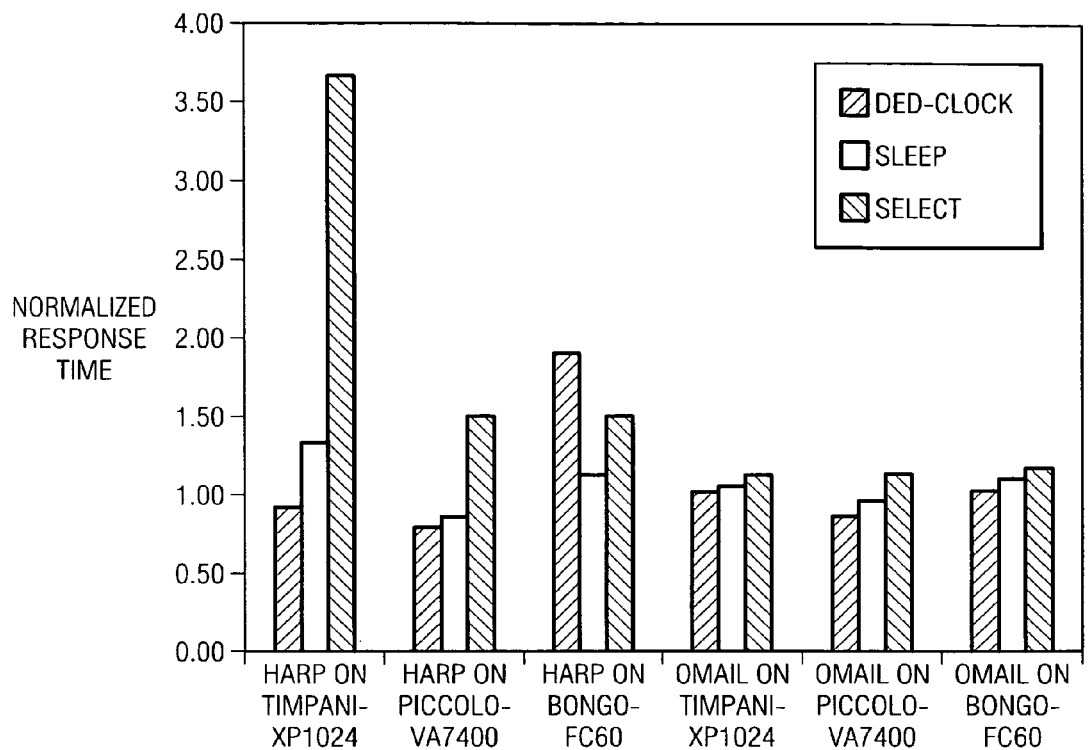
FIGS. 6A-6B show charts illustrating response time and queue size respectively, discovered in experiments conducted for three different benchmarking programs.
Figure 6B:
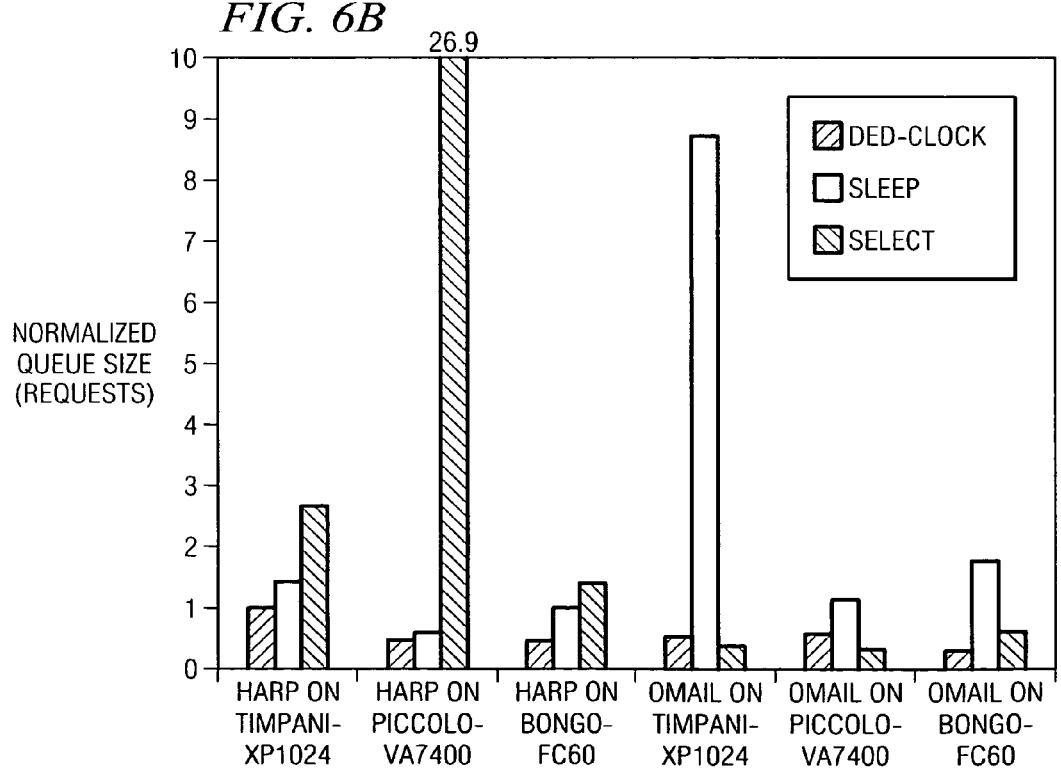

FIGS. 6A-6B present two storage-level performance metrics, namely response time and queue size respectively, that we discovered in our experiments for the above three benchmarking programs. These metrics show the relative change in I/O response time (FIG. 6A) and average queue size (FIG. 6B) using two applications ("omail" and "harp"), across three different storage arrays and benchmark systems (the details of the experimental setup are described further below under heading "Experimental Evaluation"). FIG. 6A presents the average measured response time, when different trace replay tools were used (namely the above-described DED-CLOCK, SLEEP, and SELECT tools), normalized to the average response time when an embodiment of the above-described I/O load generator 12 was used. These graphs illustrate that the inaccuracies in scheduling I/Os in time may result in as much as a factor of 3.5 difference in measured response time and a factor of 26 in measured queue sizes (both happen for the SELECT tool). These differences are too large to ignore.

Experimental Evaluation

Through our experiments we have obtained results concerning I/O issue speed, I/O issue error, and overhead of an exemplary embodiment of the above-described I/O load generator 12 for a wide variety of workloads and storage subsystems. These results are briefly described below, along with a comparison of characteristics of the generated workload and that of the original to determine the fidelity of the trace replay. Of course, the concepts presented herein are not intended to be limited in any way by the exemplary experiments and results described herein, but rather such experiments and results are presented merely for illustrative purposes as to observations regarding one embodiment of I/O load generator 12.

In our experimental setup, we used three SMP servers and five disk arrays covering a wide variety of hardware. Two of the SMP servers were HP 9000-N4000 machines: one with eight 440 MHz PA-RISC 8500 processors and 16 GB of main memory ("timpani"), the other with two 440 MHz PA-RISC 8500 processors and 1 GB of main memory ("bongo"). The third was an HP rp8400 server with two 750 MHz PA-RISC 8500 processors and 2 GB of main memory ("piccolo"). All three were running HP-UX 11.0 as the OS.

We used five disk arrays as our I/O subsystem: two HP FC-60 disk arrays and one HP XP512 disk array, one HP XP1024 disk array, and one HP VA7400 disk array. Both the XP512 and XP1024 had in-use production data on them during our experiments.

The XP1024 is a high-end disk array. We connected timpani directly to front-end controllers on the XP1024 via eight 1 GBps fibre-channel links, and used two back-end controllers each with 24 four-disk RAID-5 groups. The array exported a total of 340 14 GB SCSI logical units spread across the array groups for a total of about 5 TB of usable disk space.

Piccolo was connected via three 1 GBps links to a Brocade Silkworm 2400 fibre-channel switch, that was also connected to the XP512 and VA7400. The XP512 used two array groups on one back-end controller exporting 17 logical units totaling 240 GB of space. The VA7400 is a mid-range virtualized disk array that uses AutoRaid to change the RAID level dynamically, alternating between RAID-1 and RAID-6. It exported 50 virtual LUs, each 14 GB in size for a total of 700 GB of space spread across 48 disks.

Bongo was connected to two mid-range FC-60 disk arrays via three 1 GBps fibre channel links to a Brocade Silkworm 2800 switch. The FC-60 is a mid-range disk array; one exported 15 18 GB 2-disk RAID-1 LUs, and the other 28 36 GB 2-disk RAID-1 LUs for a total of 1300 GB of disk space.

In our experiments, we used both synthetic workloads and two application traces: a file server containing home directories of a research group ("harp"), and an e-mail server for a large company ("omail"). In order to create controlled workloads for our trace replay experiments, we also used a modified version of the PostMark benchmark ("postmark").

The synthetic workload contained uniformly spaced 1 KB I/Os, issued to 10 logical units spread over all of the available paths; the workload is designed so that most of the I/Os are cache hits. We use timpani as the host and the XP1024 disk array as the storage system for the experiments that use this workload.

The file-system trace (harp) represents 20 minutes of user activity on Sep. 27, 2002 on a departmental file server at HP Labs. The server stored a total of 59 file-systems containing user home directories, news server pools, customer workload traces, HP-UX OS development infrastructure, among others for a total of 4.5 TB user data. This is a typical I/O workload for a research group, mainly involving software development, trace analysis, simulation, and e-mail.

The omail workload is taken from the trace of accesses done by an OpenMail e-mail server on a 640 GB message store; the server was configured with 4487 users, of whom 1391 were active. The omail trace has 1.1 million I/O requests, with an average size of 7 KB.

The PostMark benchmark simulates an email system and contains a series of transactions, each of which performs a file deletion or creation, together with a read or write. Operations and files are randomly chosen. We used a scaled version of the PostMark benchmark that uses 30 sets of 10,000 files, ranging in size from 512 bytes to 200 KB. To scale the I/O load intensity, we ran multiple identical copies of the benchmark on the same file-system.

As described below, we analyzed the impact of various trace replay schemes, including an embodiment of the above-described I/O load generator 12, on the benchmarking system's behavior to achieve good timing accuracy as the I/O load on the system changes for a variety of synthetic and real application workloads. As described above, the issue error impacts the workload characteristics. As described below, our experiments analyzed the issue error of various trace replay schemes.

Figure 7A:
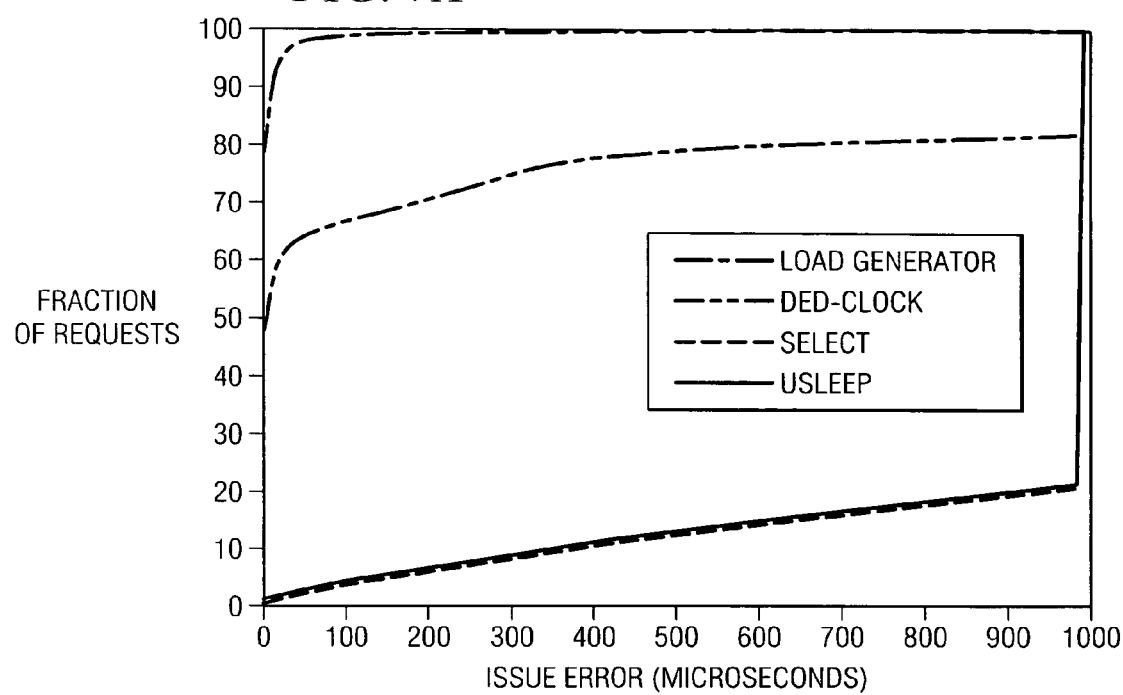
FIGS. 7A-7B show a graph plotting the CDF of the issue error for various different I/O issue techniques using an exemplary trace, referred to as the "omail" trace, when replayed on timpani with the XP1024 disk array.
Figure 7B:
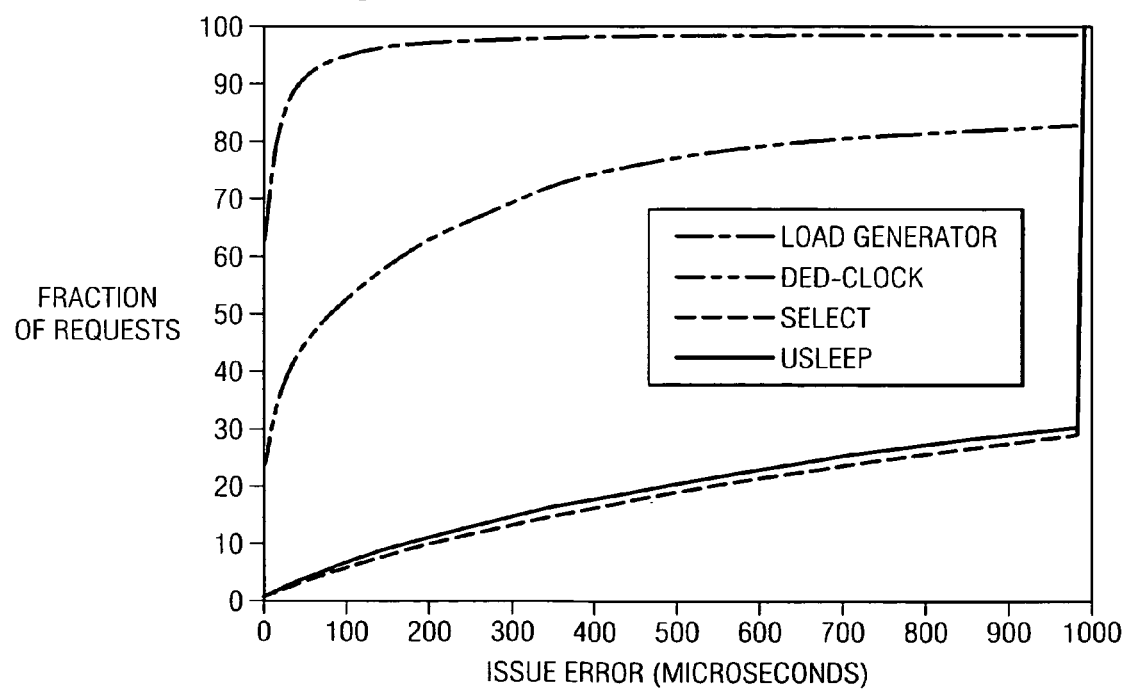
Figure 8A:
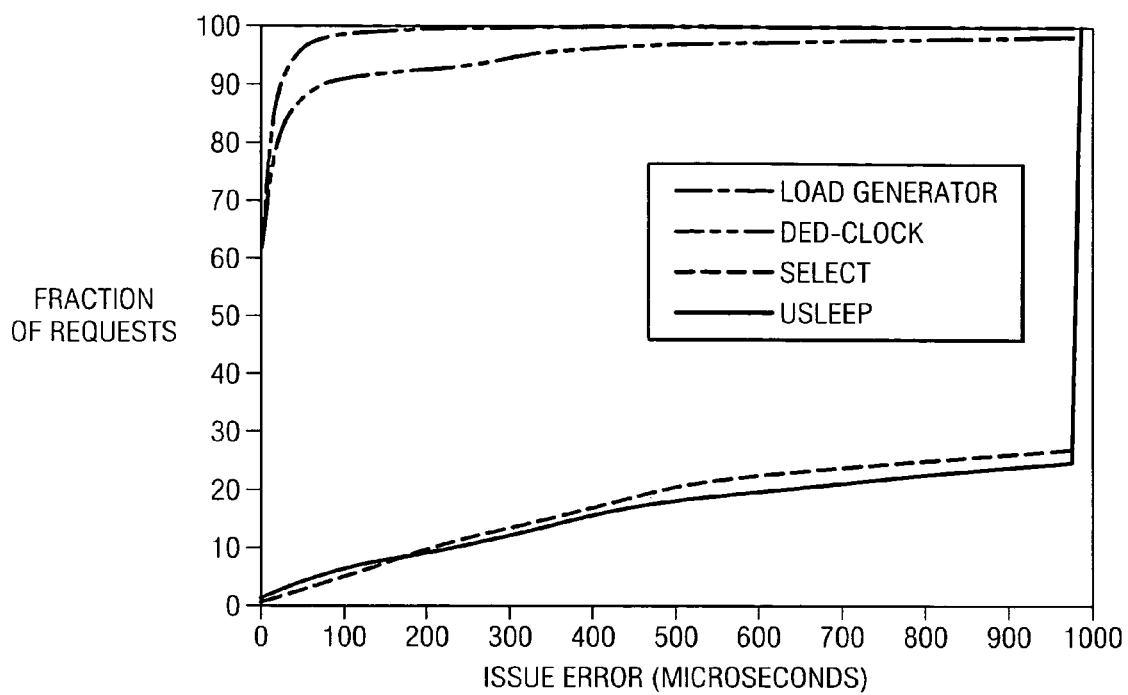
FIGS. 8A-8B show a graph plotting the CDF of the issue error for various different I/O issue techniques using another exemplary trace, referred to as the "harp" trace, when replayed on timpani with the XP1024 disk array.
Figure 8B:
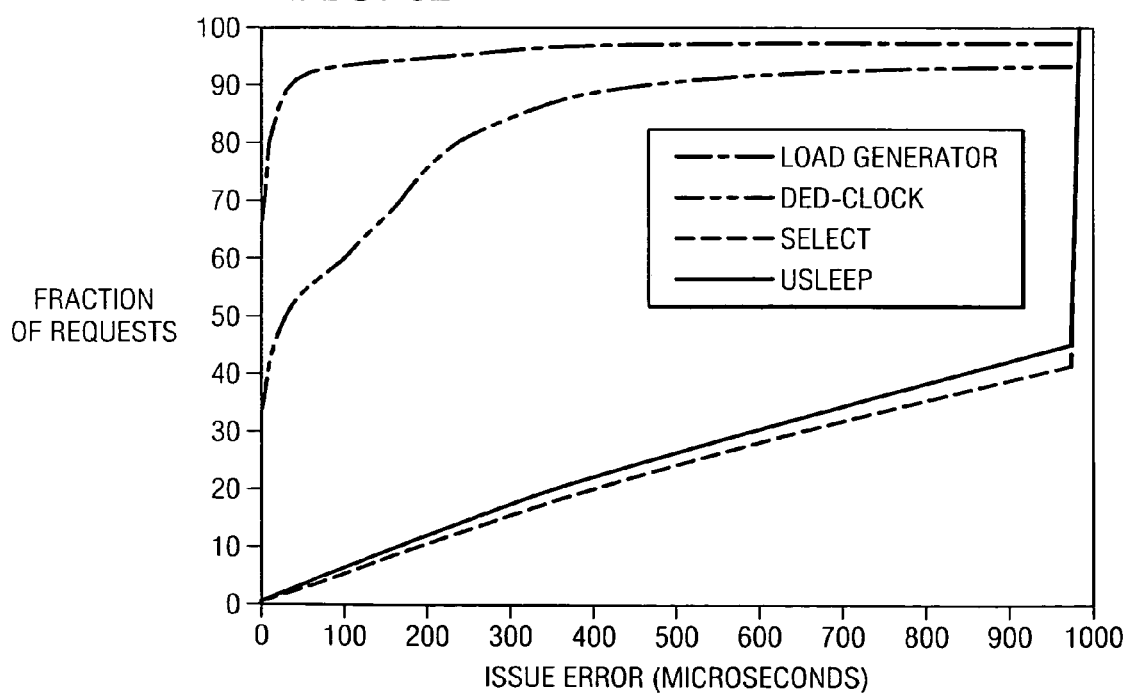

FIGS. 7A-7B show a graph plotting the cumulative distribution function (CDF) of the issue error for an embodiment of the above-described I/O load generator 12 (shown as "LOAD GENERATOR"), DED-CLOCK, SLEEP, and SELECT using the omail trace when replayed on timpani with the XP1024 disk array. FIGS. 8A-8B show a graph plotting the CDF of the issue error for an embodiment of the above-described I/O load generator 12 (shown as "LOAD GENERATOR"), DED-CLOCK, SLEEP, and SELECT using the harp trace when replayed on timpani with the XP1024 disk array. In our experiments, we used two variants of these workloads: we replay the workload at the original speed (FIGS. 7A and 8A) and quadruple the speed (FIGS. 7B and 8B). This lets us quantify the issue error as the throughput changes.

These results show that the embodiment of the I/O load generator 12 issues about 98% of the I/Os in the omail workload within 10 µs of the actual time in the original workload and 95% of the I/Os in the harp workload within less than 50 µs of their actual time. On the other hand, OS-based trace replay mechanisms fare much worse: both SLEEP and SELECT could achieve 1 millisecond of issue accuracy for only about 30% of the I/Os in either workload. The DED-CLOCK was slightly better than SLEEP and SELECT, issuing 89% of the I/Os in the harp trace and 60% of the I/Os in the omail trace within 100 µs of their intended time, and thus fared worse than the embodiment of the I/O load generator 12. This is because DED-CLOCK can more accurately keep time using the CPU cycle counters than SLEEP and SELECT, but was overwhelmed by the thread wakeup overhead when dealing with moderate I/O rates.

The results with the faster replays indicate that the exemplary embodiment of I/O load generator 12 continues to achieve high I/O issue accuracy for moderate loads: 92% of the I/Os in the harp workload and the 90% of the I/Os in the omail workload are issued within 50 µs of their intended issue times. An interesting observation is that the SLEEP and SELECT based mechanisms perform slightly better at higher load (4x issue rate) than at lower loads. This is because in the higher load case, the kernel gets more opportunities to schedule threads, and hence more I/O issuing threads get scheduled at the right time. The dedicated clock-thread based approach, however, is restrained by the speed at which the clock-thread can wake up worker threads for I/O issue, especially for the omail workload where the I/O load steadily runs at a moderate rate.

Figure 9:
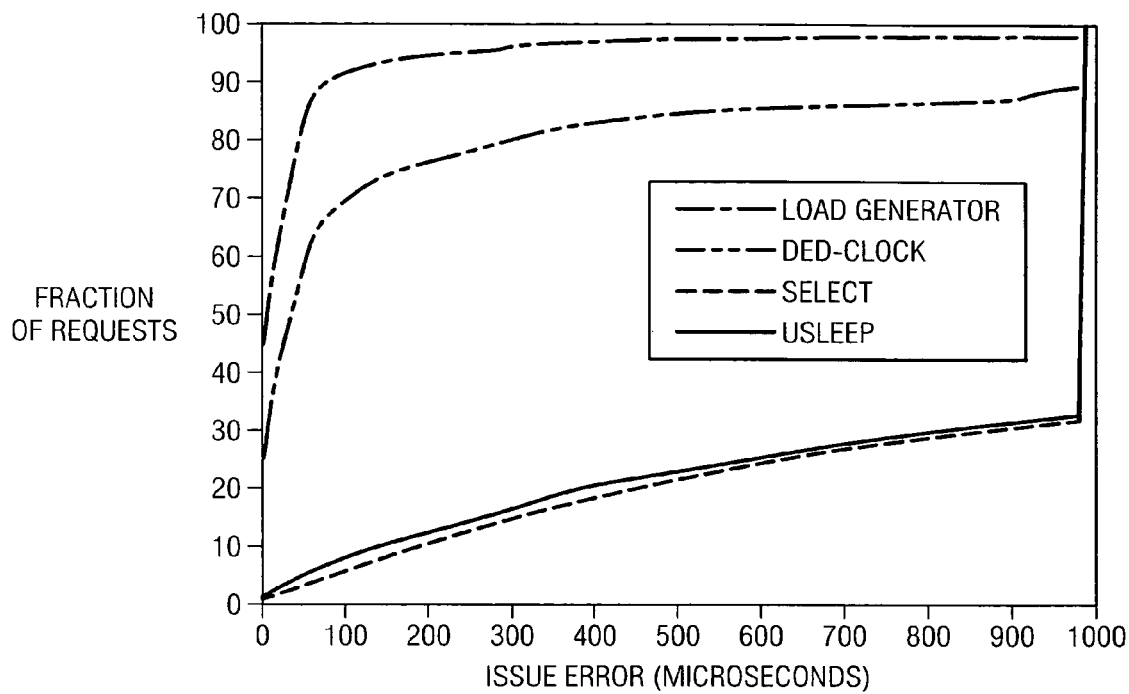
FIG. 9 shows a chart illustrating the issue error for various different I/O issue techniques for the harp trace when using a 2-processor server bongo and two mid-range FC-60 disk arrays.

FIG. 9 shows a chart illustrating the issue error for the harp workload when we use the 2-processor server bongo and the two mid-range FC-60 disk arrays. While this environment has sufficient resources to handle the steady state workload, it does not have enough resources to handle the peaks. When the arrays fall behind in servicing I/Os, contention occurs; as a result, both the exemplary embodiment of I/O load generator 12 and DED-CLOCK show heavy-tailed issue error graphs. Also, having only two processors to handle all system events introduces additional delays when interrupts are being processed.

Figure 10:
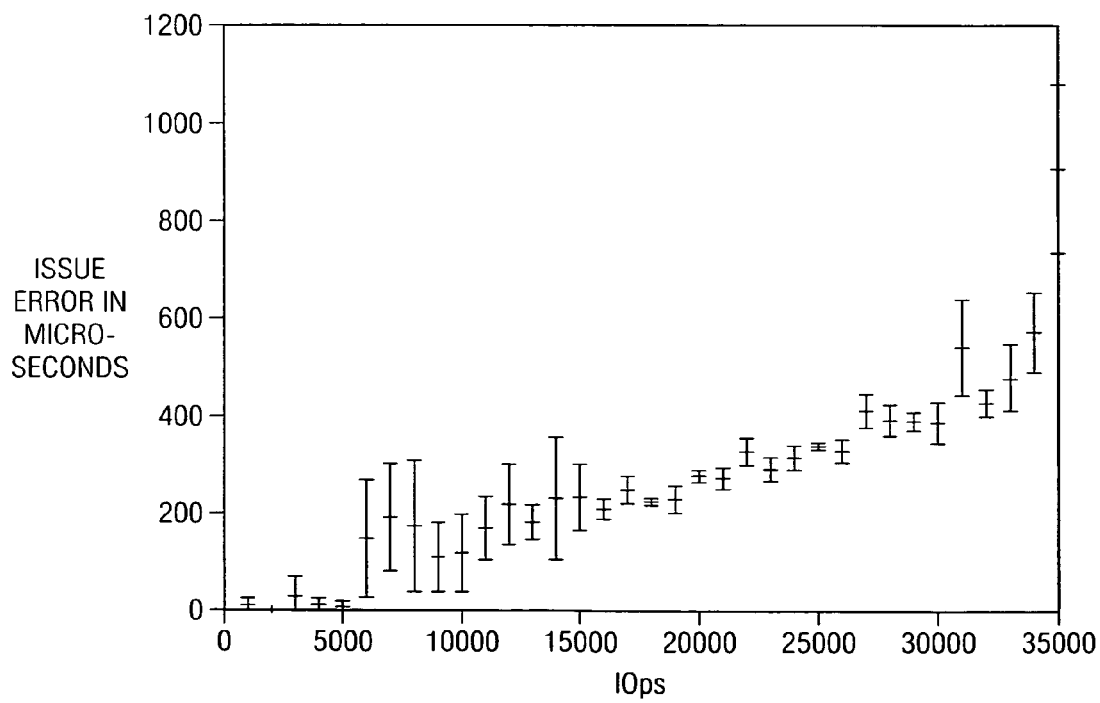
FIG. 10 shows a chart illustrating the results, with the issue error being plotted against the number of IOPS performed by an exemplary embodiment of I/O load generator of the present invention.

We also used synthetic, more regular workloads to determine how accurately the exemplary embodiment of I/O load generator 12 issues I/Os as the load increases. We measured the difference between the time that the I/O was supposed to be issued and the time when it was actually issued. The results presented are averages of 3 runs of the experiments using 3 different sets of 10 destination devices. FIG. 10 shows a chart illustrating the results, with the issue error being plotted against the number of IOPS performed by the exemplary embodiment of I/O load generator 12. We use IOPS because it correlates with the number of events that the load generator needs to handle.

Another measure of the performance of exemplary embodiment of I/O load generator 12 in terms of its overhead, is whether such load generator can get throughputs comparable to those of I/O generation tools specifically engineered to generate only a particular pattern of I/Os. To answer this question, we wrote a special-purpose program that uses multiple threads issuing I/Os using pread( ) to each of the available devices. We used timpani with the XP 1024 disk array for these experiments, and noticed that the maximum throughput we could achieve using the special-purpose program was 44000 IOPS (issuing I/Os to cached 1 KB blocks). On the same-hardware and setup, the exemplary embodiment of I/O load generator 12 could issue I/Os at 40000 IOPS, only 10% less than the special-purpose program.

Figure 11A:
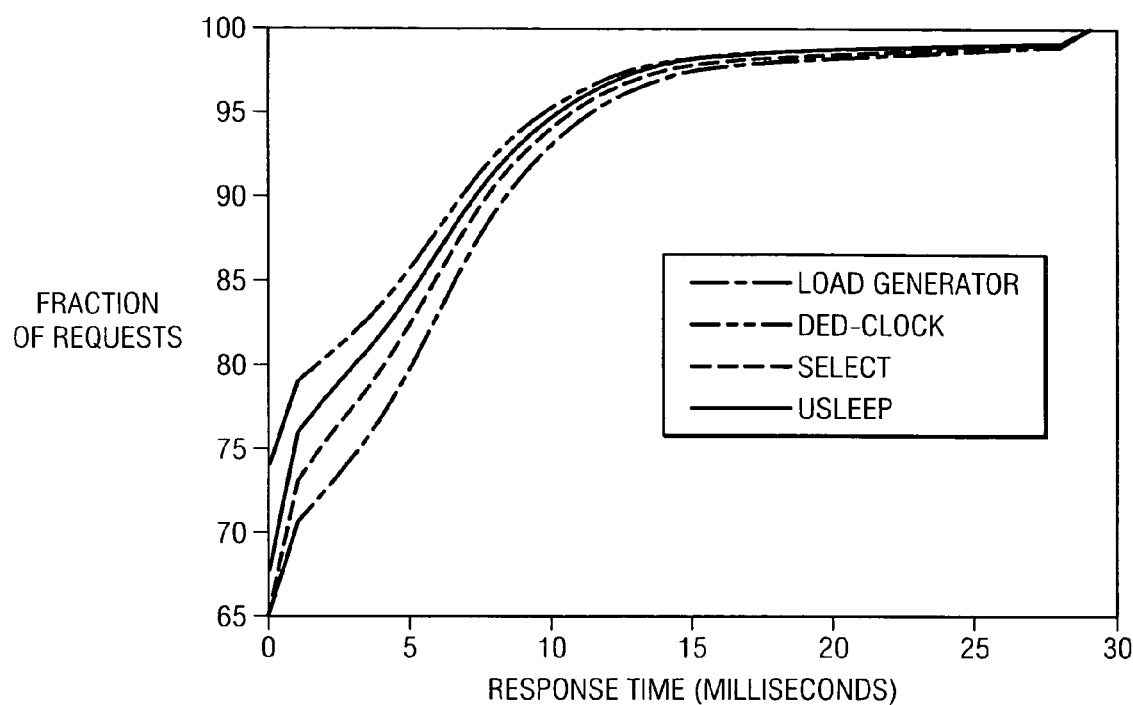
FIGS. 11A-11B show charts illustrating the CDF of the measured response times across various trace replay techniques for the omail and harp traces, respectively.
Figure 11B:
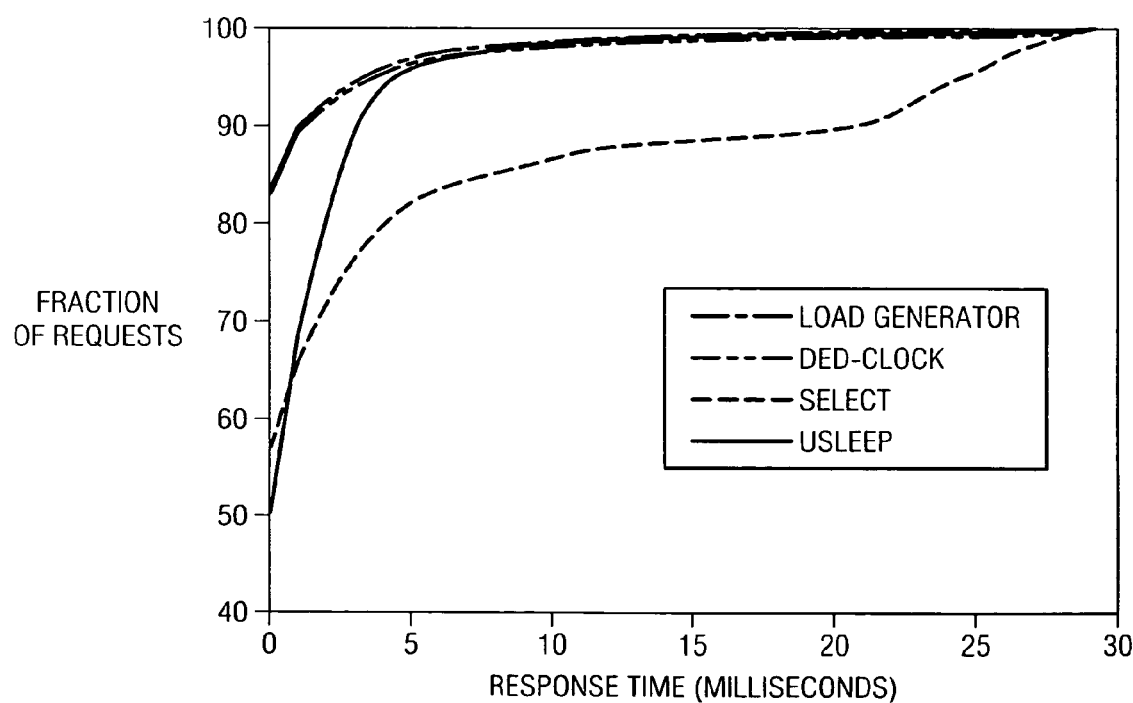
Figure 12A:
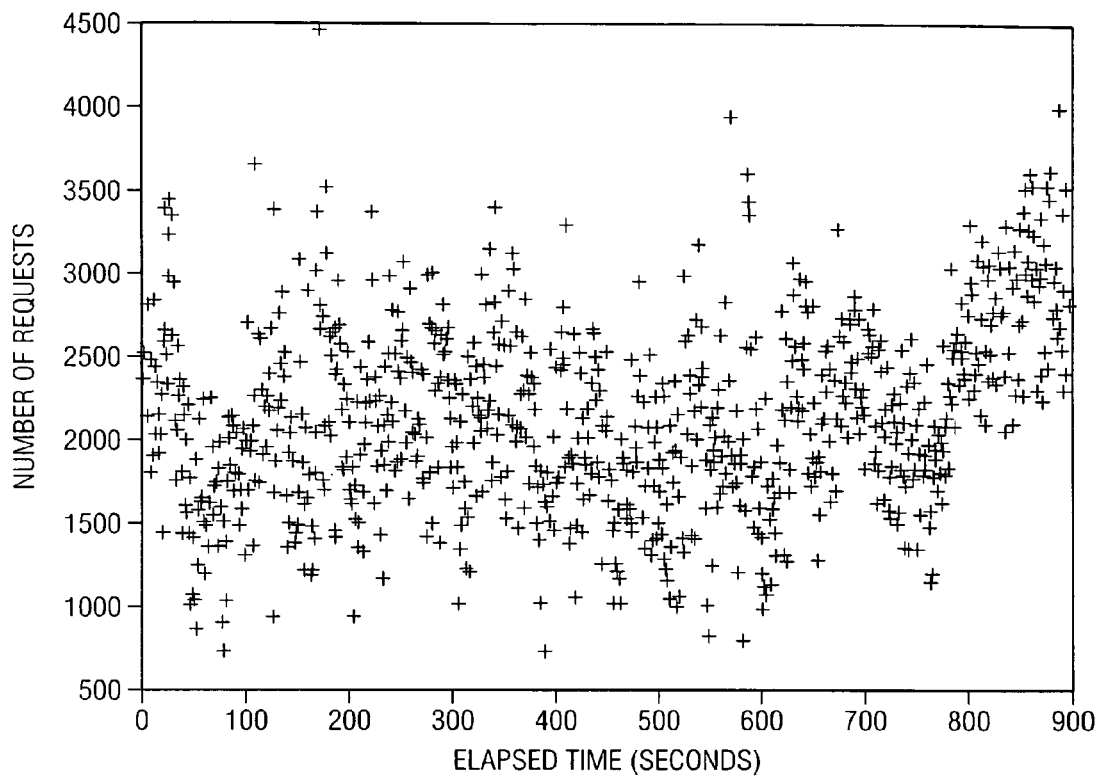
FIGS. 12A-12D show charts comparing the burstiness characteristics of the original workload with the burstiness characteristics of the workload generated by an exemplary embodiment of I/O load generator of the present invention.
Figure 12B:
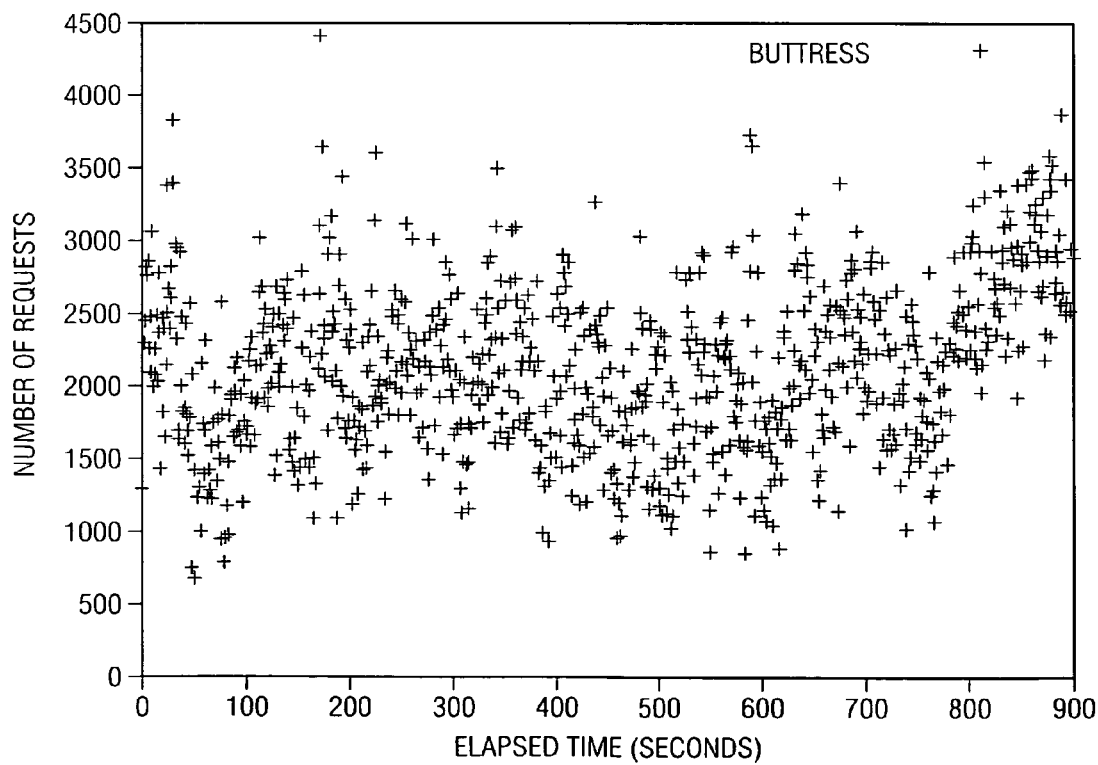
Figure 12C:
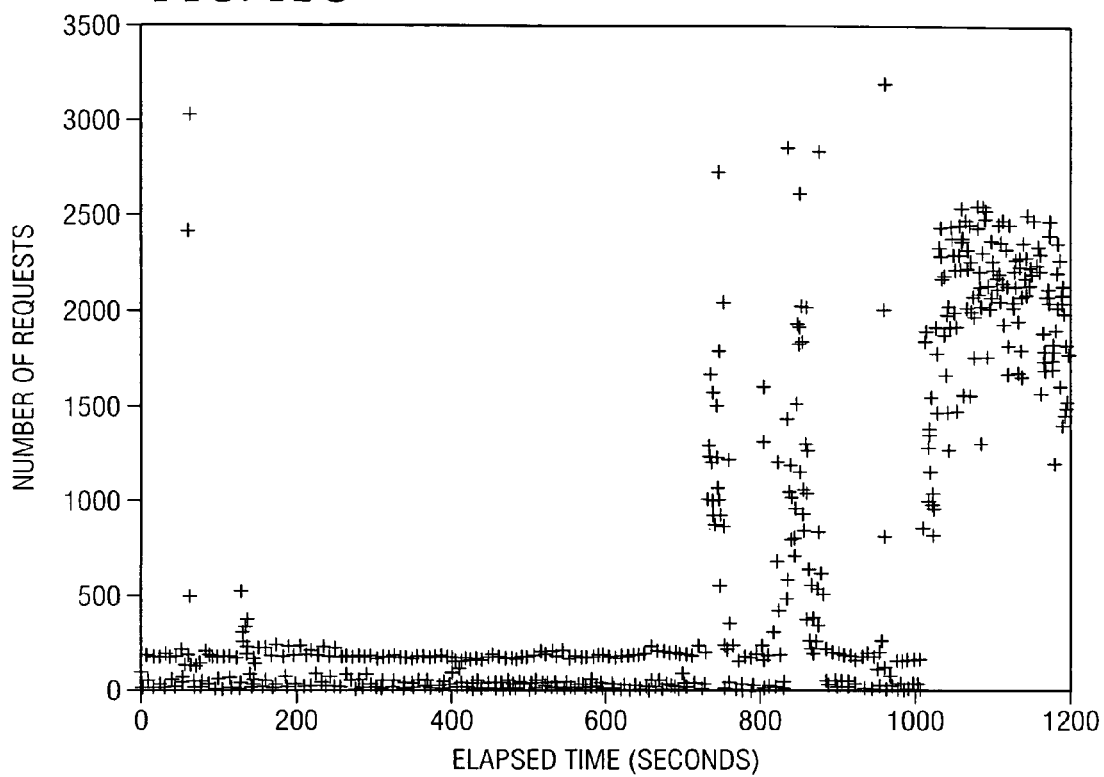
Figure 12D:
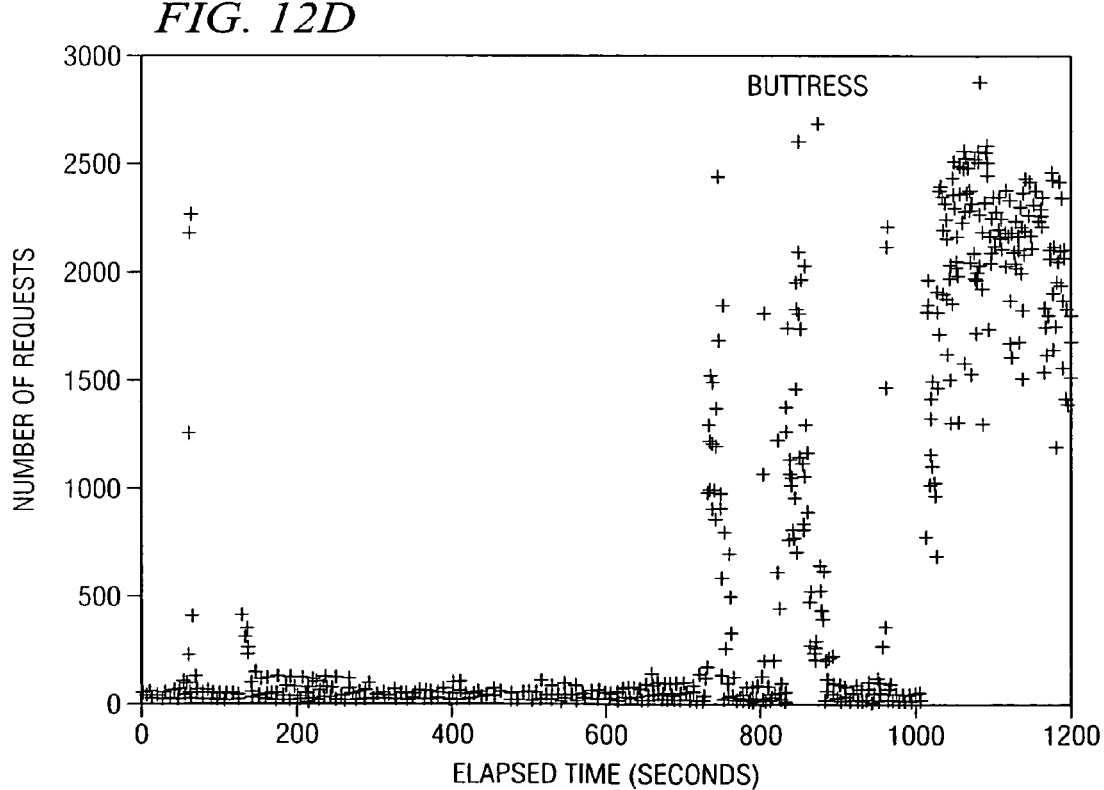

We also examined the characteristics of the I/O workloads produced using trace replay. In our experiments, we analyzed two characteristics of the I/O workload: response time and burstiness. FIGS. 11A-11B show charts illustrating the CDF of the measured response times across various trace replay mechanisms for the omail and harp traces, respectively. FIGS. 12A-12D compares the burstiness characteristics of the original workload with the burstiness characteristics of the workload generated by the exemplary embodiment of I/O load generator 12. The X-axis in the charts of FIGS. 12A-12D is the number of seconds past the start of the trace, and the Y-axis is the number of requests seen in the previous 1-second interval. These results were obtained for experiments run on timpani with the XP1024 disk array. FIG. 12A shows the burstiness characteristics of the original omail trace, while FIG. 12B shows the burstiness characteristics of the replay of such omail trace produced by the exemplary embodiment of I/O load generator 12. FIG. 12C shows the burstiness characteristics of the original harp trace at 4 times its original rate, while FIG. 12D shows the burstiness characteristics of the replay of such harp trace produced by the exemplary embodiment of I/O load generator 12. FIGS. 12A-12D visually show that the exemplary embodiment of I/O load generator 12 can mimic the burstiness characteristics of the original workload, indicating that this load generator is "accurate enough" to replay traces.

For the omail workload, all of the trace replay mechanisms are comparable in terms of the response time of the produced workload: the mean response times were within 15% of each other. For this trace, even though the I/Os were issued at a wide range of accuracy, the effects on the response time characteristics were not substantial. This is not so for the harp workload, wherein different trace replay mechanisms produce quite different response time behavior. This is partially explained by the high-burstiness exhibited in the harp workload; sharp changes in the I/O rate are difficult to reproduce accurately.

Figure 13A:
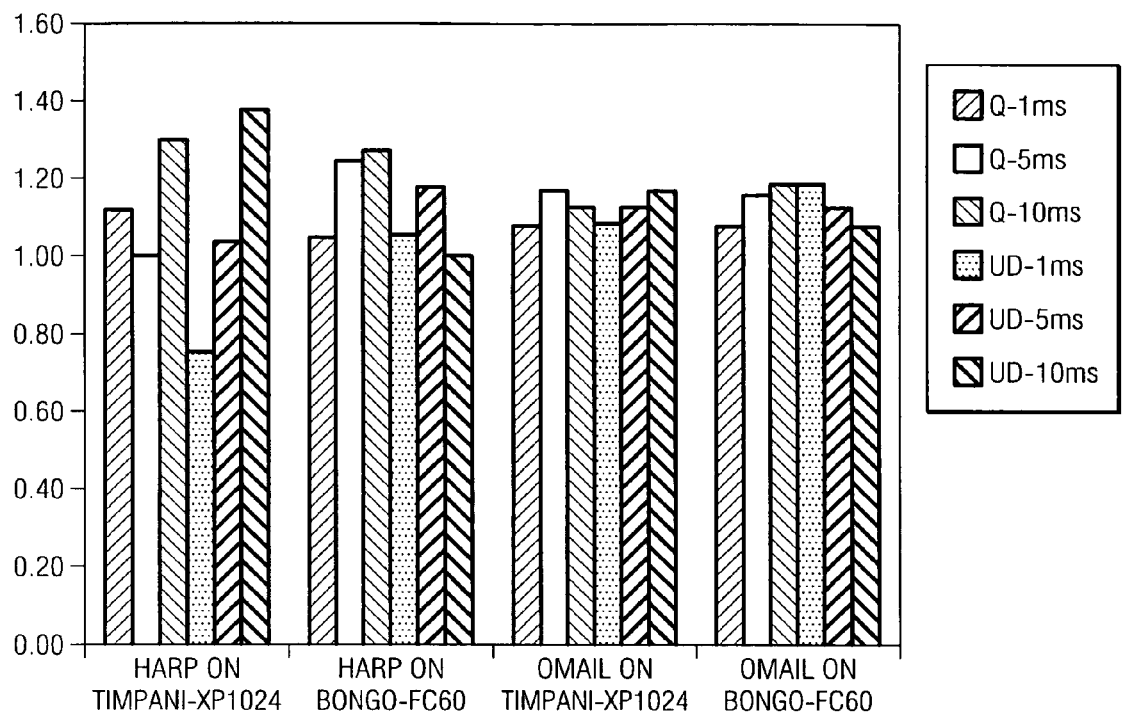
FIGS. 13A-13B show charts illustrating the results of sensitivity experiments on response time and burstiness, respectively, for an exemplary embodiment of I/O load generator of the present invention.
Figure 13B:
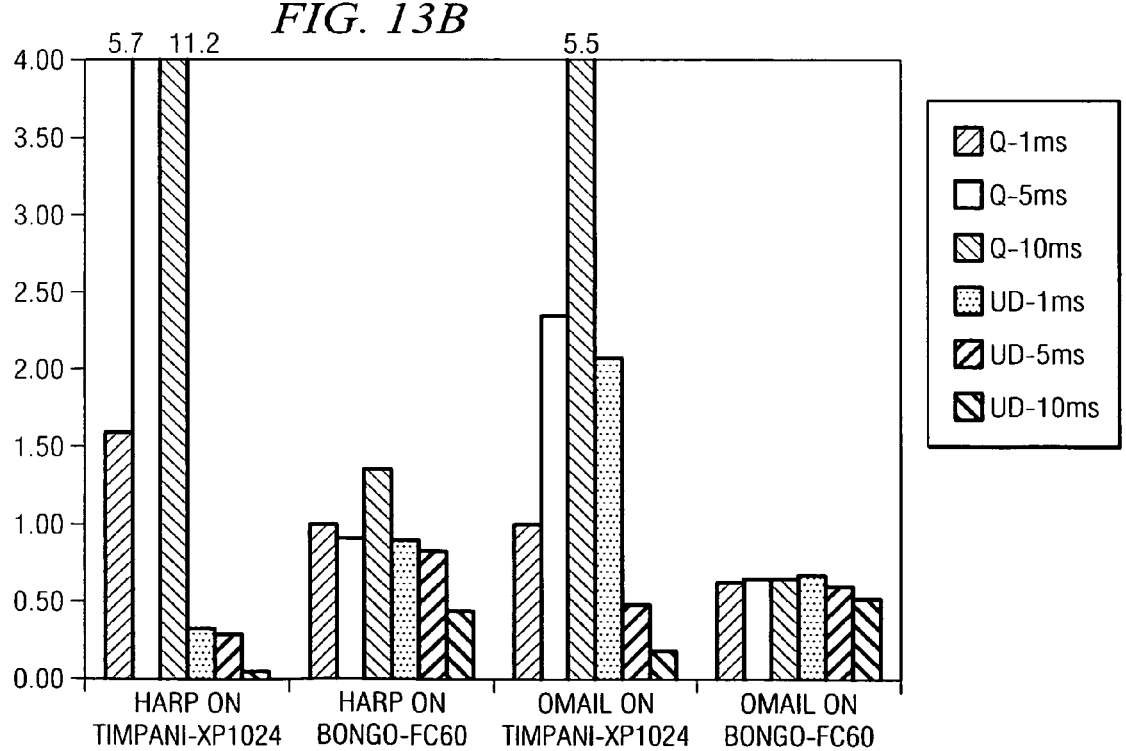

In order to understand the impact of I/O issue accuracy on the application I/O behavior, we also studied the effect of controlled issue error using two means: a) by introducing a uniform delay to the issue times of each I/O and b) by quantizing the I/O issue times around simulated scheduling boundaries. FIGS. 13A-13B show charts illustrating the results of the sensitivity experiments for response time and burstiness, respectively. That is, the charts of FIGS. 13A-13B show sensitivity analysis for the impact of I/O issue accuracy (normalized to the exemplary embodiment of I/O load generator 12) on the application I/O behavior on various systems.

All the numbers in these charts are normalized to the value of the metric reported by the exemplary embodiment of I/O load generator 12. Q-X denotes the quantization at X ms boundaries and UD-X denotes the random delay added using uniform distribution with mean X ms. FIGS. 13A-13B show that the mean response time changes as much as 37% for the harp workload and 19% for the omail workload. The effects of issue error on the burstiness characteristics (mean queue size) is more dramatic: as much as 11 times for the harp workload and five times for the omail workload. This shows that the bursty workloads are more sensitive to the delays in I/O issue times leading to modify their I/O behavior.

Figure 14:
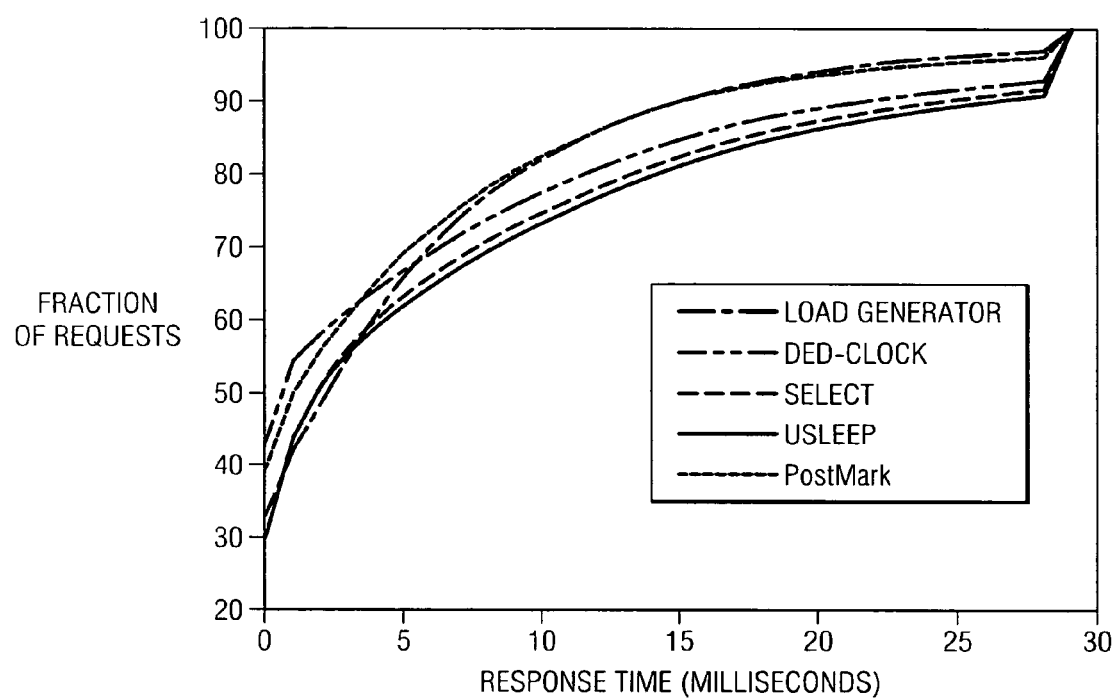
FIG. 14 shows a chart illustrating the response time characteristics for various different I/O issue techniques of an exemplary trace, referred to as the "PostMark" trace, on timpani with the XP1024 disk array measured from the workload and from the trace replays.

In addition to the application workloads collected on different systems, our experiments also analyzed the PostMark workload and its characteristics from the trace replays when using the same host and the array to replay trace as was used running PostMark. FIG. 14 shows a chart illustrating the response time characteristics of the PostMark workload on timpani with the XP1024 disk array measured from the workload and from the trace replays. The high-accuracy of the exemplary embodiment of I/O load generator 12 helps it to produce almost the exact response time statistics as the actual workload, while the less accurate mechanisms deviate significantly more.

What is claimed is:

1. A benchmarking system comprising:
a processor;
a multi-threaded load generator configured to use events for managing processing by threads, wherein the load generator is configured to utilize a thread for spinning and to use a CPU cycle counter to determine time for issuing loads to a system under test in accordance with a defined workload; and
filaments to generate said events, wherein said filaments are objects for translating said defined workload into said events.

2. The benchmarking system of claim 1 wherein the load generator is an I/O load generator for issuing I/Os to the system under test.

3. The benchmarking system of claim 2 wherein the system under test is a data storage system.

4. The benchmarking system of claim 1 wherein the load generator is a network load generator for generating network packets to the system under test.

5. The benchmarking system of claim 1 wherein said multi-threaded load generator is configured to employ bypass locking for managing access of threads to at least one resource.

6. The benchmarking system of claim 5 wherein said at least one resource comprises an event queue.

7. The benchmarking system of claim 1 further comprising:
an interface for receiving input for defining desired filaments.

8. The benchmarking system of claim 1 wherein the threads are configured to process any type of event.

9. The benchmarking system of claim 1 further comprising:
said load generator configured to employ pre-spinning for said threads.

10. The benchmarking system of claim 9 wherein said load generator is configured to start processing an event before a time specified by said event by performing an unlocked spin just before processing said event.

11. The benchmarking system of claim 1 further comprising:
one or more threads configured to spin for an event being ready to issue and then wake another thread to handle the event that is ready to issue.

12. The benchmarking system of claim 11 wherein said designated one or more threads run as low priority.

13. A benchmarking system comprising:
a processor;
a multi-threaded load generator configured to use events for managing processing by threads, wherein the load generator is configured to utilize a thread for spinning and to use a CPU cycle counter to determine time for issuing loads to a system under test in accordance with a defined workload; and
an event queue for queuing said events, wherein said event queue is logically divided into different individually lockable portions; and wherein said threads are each operable, upon desiring access to said event queue, to dynamically determine on which portion the thread is to obtain a lock.

14. The benchmarking system of claim 13 wherein a thread dynamically determines which thread is to take a lock on said event queue.

15. A method for a multi-threaded benchmarking system benchmarking a system under test, the method comprising:
(a) a first thread sleeping until awakened by another thread;
(b) after being awakened, the first thread executing on a processor and checking an event queue to determine if any event is close to its time to be processed;
(c) if determined that an event is close to its time to be processed, the first thread pre-spinning and then processing the event, wherein said pre-spinning comprises performing an unlocked spin just before an issue time specified by said event that is close to its time to be processed;
(d) if determined that no event in said event queue is close to its time to be processed, the first thread determining if any other thread is spinning;
(e) if determined that another thread is spinning, the first thread goes to sleep; and
(f) if determined that no other worker is spinning, the first thread spinning and using a CPU cycle counter to maintain time.

16. The method of claim 15 further comprising:
(g) if determined in step (f) that no other worker is spinning, the first thread monitoring the event queue for an event that is close to its time to be processed.

17. The method of claim 16 further comprising:
(h) if determined in step (g) that an event is close to its time to be processed, the first thread waking up a sleeping thread.

18. The method of claim 15 further comprising:
if determined in step (c) that an event is close to its time to be processed, the first thread determining the type of the event that is close to its time to be processed.

19. The method of claim 18 wherein said determining the type of the event comprises:
determining whether the event is an I/O event or a filament event.

20. The method of claim 15 wherein an event is determined as being close to its time to be processed if within a defined pre-spin window of time.

21. The method of claim 15 wherein said processing the event that is close to its time to be processed comprises:
performing work identified by said event at a time defined by said event.

22. The method of claim 15 wherein said processing the event that is close to its time to be processed comprises one of the following:
  issuing an I/O to a storage system;
  transmitting a packet on a network;
  executing code associated with a filament; and
  requesting an operation on a server.

23. A method for a multi-threaded benchmarking system benchmarking a system under test, the method comprising:
  (a) a first thread sleeping until awakened by another thread;
  (b) after being awakened, the first thread executing on a processor and checking an event queue to determine if any event is close to its time to be processed;
  (c) if determined that an event is close to its time to be processed, the first thread pre-spinning and then processing the event;
  (d) if determined that no event in said event queue is close to its time to be processed, the first thread determining if any other thread is spinning;
  (e) if determined that another thread is spinning, the first thread goes to sleep; and
  (f) if determined that no other worker is spinning, the first thread spinning and using a CPU cycle counter to maintain time,
  wherein a workload specification defines a workload, and at least one filament translates the workload specification into events.

24. A multi-threaded benchmarking system for benchmarking a system under test, the benchmarking system comprising:
  at least one processor; and
  at least one storage medium to store executable code that, when executed by the at least one processor, causes a thread to:
  enter a check event queue state in which the thread checks an event queue and determines if a filament event or a load event is issuable, and if determined that a filament event is issuable the thread transitions to a call filament state, and if determined that a load event is issuable the thread transitions to an execute load state;
  wherein the call filament state is a state in which the thread calls a filament;
  enter a queue events state in which the thread queues, in the event queue, events generated by a filament, wherein said filament is an object for translating a defined workload into events;
  wherein the execute load state is a state in which the thread executes a ready load event to issue a load to the system under test; and
  enter a spin state in which the thread executes a loop using a CPU cycle counter to maintain time.

25. The system of claim 24 wherein in the spin state the thread waits for an event to be issuable.

26. The system of claim 24 comprising the check event queue, call filament, queue events, execute load, and spin states for a plurality of threads.

27. The system of claim 24 wherein the executable code further causes the thread to transition to a
  sleep state from the check event queue state if no ready events are determined in the event queue and there exists another thread in the spin state.

28. The system of claim 27 wherein upon the thread determining in the check event queue state that a filament event or a load event is issuable, the thread wakes up another worker.

29. The system of claim 28 wherein the awakened another worker enters the spin state.

30. The system of claim 24 wherein the thread transitions to the spin state from the check event queue state if no ready events are determined in the event queue and no other thread is in the spin state.

31. The system of claim 24 wherein the thread transitions to the call filament state when a filament event in the event queue is issuable.

32. The system of claim 24 wherein the thread transitions to the call filament state when the thread completes a load event.

33. The system of claim 24 wherein the thread transitions to the queue events state from the call filament state, and in the queue events state the thread queues events generated by a called filament.

34. The system of claim 24 wherein said execute load state is a state in which the thread executes a ready I/O event to issue an I/O to the system under test.

35. The system of claim 24 wherein said execute load state is a state in which the thread executes a ready network event to issue network packets to the system under test.

* * * * *